United States Patent
Togino

[11] Patent Number: 5,991,103
[45] Date of Patent: Nov. 23, 1999

[54] PRISM OPTICAL SYSTEM

[75] Inventor: Takayoshi Togino, Koganei, Japan

[73] Assignee: Olympus Optical Co., Ltd., Tokyo, Japan

[21] Appl. No.: 08/928,406

[22] Filed: Sep. 12, 1997

Related U.S. Application Data

[63] Continuation of application No. 08/545,936, Oct. 20, 1995, abandoned.

[30] Foreign Application Priority Data

Oct. 21, 1994  [JP]  Japan ................................. 6-256676

[51] Int. Cl.$^6$ ............................. G02B 5/04; G02B 27/14
[52] U.S. Cl. ......................... 359/834; 359/631; 359/633; 345/8
[58] Field of Search ..................... 359/834, 835, 359/836, 629, 634, 631, 633; 354/219, 224, 225; 396/373, 384, FOR 859; 348/341; 345/7, 8

[56] References Cited

U.S. PATENT DOCUMENTS

| | | | |
|---|---|---|---|
| 2,323,005 | 6/1943 | Bertele | 354/225 |
| 3,424,516 | 1/1969 | Snyder | 359/834 |
| 3,555,563 | 1/1971 | Grossman | 351/46 |
| 3,720,467 | 3/1973 | Strong | 359/834 |
| 3,967,290 | 6/1976 | Waaske | 354/224 |
| 4,063,261 | 12/1977 | Kuboshima | 354/225 |
| 4,064,516 | 12/1977 | McLaughlin et al. | 354/224 |
| 4,082,432 | 4/1978 | Kirschner | 359/631 |
| 4,206,988 | 6/1980 | Miyamoto et al. | 354/219 |
| 4,269,476 | 5/1981 | Gauthier et al. | |
| 4,289,392 | 9/1981 | Kobori et al. | 354/225 |
| 4,291,945 | 9/1981 | Hayamizu | 359/834 |
| 4,802,750 | 2/1989 | Welck. | |
| 4,833,494 | 5/1989 | Ohsawa | 354/219 |
| 4,874,214 | 10/1989 | Cheysson et al. | |
| 4,969,724 | 11/1990 | Ellis. | |
| 5,000,544 | 3/1991 | Staveley. | |
| 5,255,030 | 10/1993 | Mukai et al. | |
| 5,489,965 | 2/1996 | Mukai et al. | |
| 5,506,728 | 4/1996 | Edwards et al. | 359/634 |
| 5,530,586 | 6/1996 | Yasugaki | 359/501 |
| 5,539,578 | 7/1996 | Togino et al. | 359/631 |
| 5,546,227 | 8/1996 | Yasugaki et al. | 359/638 |

FOREIGN PATENT DOCUMENTS

| | | | |
|---|---|---|---|
| 3-221934 | 9/1991 | Japan. | |
| 0491707 | 9/1938 | United Kingdom | 359/834 |

OTHER PUBLICATIONS

Emsley; "Reflective Prisms", The Optician; vol. 143; No. 3713; Jun. 1962; pp. 535–538.

Emsley; "Reflective Prisms", The Optician; vol. 143; No. 3714; Jun. 1962; pp. 565–568.

*Primary Examiner*—Ricky D. Shafer
*Attorney, Agent, or Firm*—Pillsbury Madison & Sutro LLP

[57] ABSTRACT

A prism optical system for use as an ocular optical system of a visual display apparatus, which has a compact size as a whole, causes a minimal reduction of the light intensity in the ocular optical system, provides a wide field angle and a large exit pupil diameter, and is effectively corrected for off-axis aberrations. The prism optical system has two transparent surfaces (6 and 7), and two reflecting surfaces (2 and 3). The space between the first transparent surface (6) and the second transparent surface (7) is filled with a medium having a refractive index not smaller than 1.3. Assuming that a light ray which emanates from the center of an image surface (1) and is perpendicularly incident on a pupil position (5) is defined as a chief ray, the two reflecting surfaces (2 and 3) are disposed such that both the reflecting surfaces are tilted with respect to the chief ray, and that the two reflecting surfaces (2 and 3) are tilted relative to each other so as to diverge toward the image surface (1) or the pupil position (5) in a plane in which the optical axis bends. At the same time, the two reflecting surfaces (2 and 3) are disposed so that a light ray emanating from the image surface (1) approximately intersects a light ray which emanates from the second transparent surface (7) and enters the pupil position (5).

32 Claims, 10 Drawing Sheets

42 Aluminum coating
41 Substrate (glass)

41 Substrate (glass)
43 Semitransparent thin film

41 Substrate (glass)
44 Polarizing semi-transparent thin film

PRISM OPTICAL SYSTEM

This is a continuation of application Ser. No. 08/545,936, filed on Oct. 20, 1995, which was abandoned upon the filing hereof Sep. 12, 1997.

BACKGROUND OF THE INVENTION

The present invention relates to a prism optical system. More particularly, the present invention relates to a prism optical system for use as an ocular optical system of a visual display apparatus which comprises a two-dimensional image display device for displaying an observation image, and an ocular optical system for projecting the displayed image in the air as an enlarged image. The prism optical system has a compact size as a whole, causes a minimal reduction of the light intensity in the ocular optical system, and provides a large exit pupil diameter.

FIG. 2 is a sectional view showing the arrangement of an optical system of a conventional visual display apparatus proposed in Japanese Patent Application Unexamined Publication (KOKAI) No. 3-221934. In the figure, reference numeral 1 denotes a two-dimensional image display device, 2 a first reflecting plane, 3 a second reflecting plane, 4 a lens having positive refracting power, and 5 an observer's pupil position. In this case, display light emanating from the two-dimensional image display device 1 is successively reflected by the first reflecting plane 2 and the second reflecting plane 3 in the mentioned order and converged by the positive lens 4 to form an image displayed on the two-dimensional image display device 1 at a distance. The image is re-formed on the retinal of the observer's eyeball via the observer's pupil position 5, thereby allowing the observer to see the displayed image.

In the prior art, only the positive lens 4 has refracting power. Therefore, the principal point of the ocular optical system lies in the vicinity of the lens 4.

In general, if the observer's pupil is placed in the vicinity of the exit pupil position of an optical system, the quantity of light eclipsed is minimized. Accordingly, if the observer's pupil is placed in the vicinity of the exit pupil position 5 in FIG. 2, the focal length of the ocular optical system becomes approximately equal to the eye point distance because the principal point of the ocular optical system lies in the vicinity of the positive lens 4.

Further, an image to be viewed by the observer cannot be projected at a distance unless the two-dimensional image display device 1 is disposed in the vicinity of the front focal point of the ocular optical system. That is, the length of the optical path that extends from the two-dimensional image display device 1 to the positive lens 4 via the reflecting planes 2 and 3 also needs to be approximately equal to the focal length of the ocular optical system.

Accordingly, if no sufficiently long eye point distance is provided, it will be impossible to ensure a space sufficient for light from the two-dimensional image display device 1 to enter the positive lens 4 by being reflected by the first reflecting plane 2 and the second reflecting plane 3, giving rise to a problem that light rays are eclipsed by the plane mirrors 2 and 3 and the two-dimensional image display device 1.

However, if the focal length of the positive lens 4 is increased in order to prevent an eclipse of light rays, the eye point distance becomes excessively long, making it difficult to realize a compact ocular optical system.

Meanwhile, it is important to increase the exit pupil diameter of the ocular optical system with a view to preventing an eclipse of the observation image caused by rolling of the observer's eyeball and also to providing an image display apparatus which needs no adjustment of the interpupillary distance or the like, and which is easy to see. However, it has heretofore been difficult to increase the exit pupil diameter of the ocular optical system, that is, to reduce the F-number, in the optical system which comprises only the positive lens system 4.

SUMMARY OF THE INVENTION

In view of the above-described problems of the prior art, an object of the present invention is to provide a prism optical system for use as an ocular optical system of a visual display apparatus, which has a compact size as a whole, causes a minimal reduction of the light intensity in the ocular optical system, provides a wide field angle and a large exit pupil diameter, and is effectively corrected for off-axis aberrations.

To attain the above-described object, the present invention provides a first prism optical system which has at least two transparent surfaces, and at least two reflecting surfaces. The surfaces include a first transparent surface, a first reflecting surface, a second reflecting surfacer and a second transparent surface, which are disposed in order from the image surface side along an optical path. The space between the first transparent surface, which is disposed at the image surface side, and the second transparent surface, which is disposed at the pupil side, is filled with a medium having a refractive index not smaller than 1.3. Assuming that a light ray which emanates from the center of the image surface, and which is deviated and reflected by the at least two transparent surfaces and the at least two reflecting surfaces and perpendicularly incident on the pupil position is defined as a chief ray, the at least two reflecting surfaces are disposed such that both the reflecting surfaces are tilted with respect to the chief ray, and that the at least two reflecting surfaces are tilted relative to each other so as to diverge toward the image surface or the pupil position in a plane in which the optical axis bends. At the same time, the at least two reflecting surfaces are disposed so that a light ray emanating from the image surface approximately intersects a light ray which emanates from the second transparent surface and enters the pupil position.

In addition, the present invention provides a second prism optical system for use as an ocular optical system of a visual display apparatus which includes a two-dimensional image display device for displaying an observation image, and an ocular optical system for projecting the image of the two-dimensional image display device in the air as an enlarged image. The ocular optical system has at least two transparent surfaces and at least two reflecting surfaces. The surfaces include a first transparent surface, a first reflecting surface, a second reflecting surface, and a second transparent surface, which are disposed in order from the two-dimensional image display device side. The space between the first transparent surface, which is disposed at the two-dimensional image display device side, and the second transparent surface, which is disposed at the observer's eyeball side, is filled with a medium having a refractive index not smaller than 1.3. Assuming that a light ray which emanates from the center of the two-dimensional image display device, and which is deviated and reflected by the at least two transparent surfaces and the at least two reflecting surfaces and perpendicularly incident on the observer's eyeball is defined as a chief ray, the at least two reflecting surfaces are disposed such that both the reflecting surfaces are tilted with respect to the chief ray, and that the at least two reflecting surfaces are tilted relative to each other so as to diverge toward the two-dimensional image display device or the observer's eyeball in a plane in which the optical axis bends. At the same time, the at least two reflecting surfaces are disposed so that a light ray emanating from the two-dimensional image display device approximately intersects a light ray which emanates from the ocular optical system and enters the observer's eyeball.

In the above-described prism optical systems, it is preferable that at least one of the two reflecting surfaces, which constitute a prism optical system, should be a reflecting surface having positive power.

The function of a prism optical system of the present invention, arranged as described above, will be explained below.

FIG. 1 is a sectional view of a visual display apparatus which employs a prism optical system according to the present invention. In the figure, reference numeral 1 denotes a two-dimensional image display device, 6 a first transparent surface, 2 a first reflecting surface, 3 a second reflecting surface, 7 a second transparent surfacer 4 a lens system having positive refracting power, and 5 a pupil position. Reference symbol P denotes a prism.

In the present invention, first, the space between the first transparent surface 6 and the second transparent surface 7 is filled with a medium having a refractive index not smaller than 1.3, thereby enabling the optical path length to be increased. Thus, it becomes possible to increase the space between the first transparent surface 6 and the second transparent surface 7 in the ocular optical system and to prevent an eclipse of light rays even if the focal length of the ocular optical system is reduced, as has been described in regard to the prior art. In other words, it becomes possible to reduce the focal length of the ocular optical system and hence possible to construct a compact prism optical system.

When such a prism optical system is used as an ocular optical system, it is possible to reduce the focal length of the ocular optical system. Accordingly, it is possible to provide an ocular optical system which has a compact structure and yet provides a wide field angle.

It is even more desirable from the viewpoint of aberration correction that at least one of the two reflecting surfaces 2 and 3 should have positive refracting power. This will be explained below with reference to FIG. 3, which illustrates an optical ray trace of an optical system. In FIG. 3, reference numeral 1 denotes a two-dimensional image display device, and 6 a first transparent surface. A reflecting plane 2 serves as a first reflecting surface by which a bundle of light rays entering the prism P is first reflected. A reflecting concave surface 3 serves as a second reflecting surface that reflects the light ray bundle reflected by the reflecting plane 2 toward an observer's pupil. Reference numeral 7 denotes a second transparent surface through which the light ray bundle emanates from the prism P, and 5 an observer's pupil position. Reference symbol Z denotes a visual axis lying when the observer sees forward. A bundle of chief rays is denoted by $L_{CR}$, and bundles of axial and extra-axial rays are denoted by $L_{MR}$. In the illustrated arrangement, the lens system 5 having positive refracting power in FIG. 1 is replaced by the second transparent surface 7.

In a transmission lens system, chromatic and spherical aberrations are produced by the dispersion of glass. However, if the reflecting surface 3 is provided with positive power by forming it into a concave surface, no chromatic aberration occurs in theory, and spherical aberration is advantageously reduced in comparison to that produced in a refracting lens system.

However, when the concave mirror 3 is decentered, aberrations which are not symmetric with respect to the optical axis are produced by the decentration.

In the ocular optical system of the present invention, the reflecting surface 3 is formed from a back-coated mirror, thereby succeeding in minimizing aberrations caused by the decentration. Although in the following description the second reflecting surface 3 is provided with positive refracting power, as has been described above, it will be obvious that similar effect can be achieved by providing the first reflecting surface 2 with positive refracting power.

If the reflecting surface 3 is selected from among the optical elements constituting the ocular optical system as a reflecting concave surface which has power and is decentered with respect to the optical axis, the reflecting concave surface 3 is likely to produce field curvature and comatic aberration which are not rotationally symmetric with respect to the optical axis. That is, it is important to suppress occurrence of off-axis aberrations at the reflecting concave surface 3 in order to cope with the demand for achievement of a wide field angle and a large pupil diameter. In order to enable the observer to view an image of wide field angle, the chief ray bundle $L_{CR}$ emanating from the two-dimensional image display device 1 must have a large beam diameter. However, when the chief ray bundle $L_{CR}$ is incident on the reflecting concave surface 3 via the reflecting plane 2, a large amount of field curvature occurs. Further, it is necessary in order to increase the pupil diameter that a light ray bundle emanating from the two-dimensional image display device 1 at each image height should have a large numerical aperture. This causes the diameters of the axial and extra-axial ray bundles $L_{MR}$ at the reflecting concave surface 3 to increase, thus producing a large amount of comatic aberration at the reflecting concave surface 3.

In order to correct the above-described off-axis aberrations, it is important to dispose the transparent surface 6 in an optical path connecting the two-dimensional image display device 1 and the reflecting plane 2 and to fill the space between the transparent surface 6 and the reflecting plane 2 with a medium having a refractive index larger than 1. With such an arrangement, the divergence angles of the axial and extra-axial ray bundles $L_{MR}$ after passing through the transparent surface 6 reduce, and the diameters of the axial and extra-axial ray bundle $L_{MR}$ when incident on the reflecting concave surface 3 narrow. Thus, it becomes possible to reduce the amount of comatic aberration produced at the reflecting concave surface 3.

It is also important to dispose the transparent surface 7 in an optical path connecting the observer's pupil 5 and the reflecting concave surface 3 and to fill the space between the transparent surface 7 and the reflecting concave surface 3 with a vitreous material having a refractive index not smaller than that of air. With such an arrangement, even if the diameter of the chief ray bundle $L_{CR}$ when incident on the reflecting concave surface 3 is small, when the chief ray bundle $L_{CR}$ reaches the observer's pupil 5, it has a large angle with respect to the visual axis Z lying when the observer sees forward. In other words, it becomes possible to provide a sufficiently wide field angle to the observer and, at the same time, to minimize the amount of field curvature produced.

That is, if the space between the transparent surfaces 6 and 7 is filled with a medium having a refractive index not smaller than 1.3, and these optical elements are formed as a prism P, the ray bundle has a small field angle and a small pupil diameter at the first reflecting surface 2 or the reflecting concave surface 3 as a second reflecting surface, which are decentered. Therefore, it is possible to avoid aggravation of aberration at the reflecting surface.

It is even more desirable to fill the space between the transparent surfaces 6 and 7 with a medium having a refractive index not smaller than 1.5. By doing so, the diameter of the ray bundle at the reflecting surface can be further reduced, and it becomes possible to observe an image of wider field angle.

It is even more desirable that the first transparent surface 6 should be provided with power so as to serve as a refracting surface. By doing so, the transparent surface 6 is allowed to have a function of reducing the diameters of the chief ray bundle $L_{CR}$ and the axial and extra-axial ray bundles $L_{MR}$.

Similarly, if the second transparent surface 7 is provided with power so as to serve as a refracting surface, it is possible to enlarge the diameters of the chief ray bundle $L_{CR}$ and the axial and extra-axial ray bundles $L_{MR}$, which are to reach the observer's pupil 5, at the transparent surface 7 even if the diameters of the chief ray bundle $L_{CR}$ and the axial and extra-axial ray bundles $L_{MR}$ at the reflecting surface are small. That is, the transparent surfaces 6 and 7 each assist correction of off-axis aberrations, i.e. field curvature and comatic aberration, thus enabling the observer to view a clearer and flatter image.

In a case where both the reflecting surfaces 2 and 3 of the prism P constituting the ocular optical system are formed from concave surfaces having positive power, it is even more desirable, with a view to reducing the fatigue of the observer's eye, to tilt the two-dimensional image display device 1 such that an end of the display device 1 which is closer to the second reflecting surface 3 is closer to the observer's visual axis Z than an end of the image display device 1 which is closer to the observer's pupil 5.

The function of the above-described arrangement will be explained below with reference to FIGS. 4, 5(a) and 5(b). In FIG. 4, reference numeral 1 denotes a two-dimensional image display device. A prism P is composed of a first transparent surface 6, a first reflecting surface 2, a second reflecting surface 3, and a second transparent surface 7. Reference numeral 5 denotes an observer's pupil position, and reference symbol Z denotes an observer's visual axis. $L_{UP}$ denotes an upper extra-axial ray bundle as viewed from the observer's pupil 5, and $L_{LOW}$ denotes a lower extra-axial ray bundle as viewed from the observer's pupil 5.

FIG. 5(a) illustrates the paraxial power distribution for the upper extra-axial ray bundle $L_{UP}$, and FIG. 5(b) illustrates the paraxial power distribution for the lower extra-axial ray bundle $L_{LOW}$. In FIGS. 5(a) and 5(b), reference numeral 1 denotes a two-dimensional image display device, 2 a first reflecting surface, 3 a second reflecting surface, and 5 an observer's pupil. Reference symbols $H_1$ and $H_2$ denote principal points of the optical system. Reference symbol f denotes the focal length of the optical system, and $F_O$ the front focal point of the optical system.

As will be clear from FIG. 4, the lower extra-axial ray bundle $L_{LOW}$ is shorter than the upper extra-axial ray bundle $L_{UP}$ for the distance from the first reflecting surface 2 to the second reflecting surface 3. However, the lower extra-axial ray bundle $L_{LOW}$ is longer than the upper extra-axial ray bundle $L_{UP}$ for the distance from the two-dimensional image display device 1 to the first reflecting surface 2. As will be clear from FIGS. 5(a) and 5(b), the lower extra-axial ray bundle $L_{LOW}$ and the upper extra-axial ray bundle $L_{UP}$ undergo different power distributions of the optical system.

That is, the front focal point $F_O$ for the lower extra-axial ray bundle $L_{LOW}$ lies closer to the optical system than the front focal point $F_O$ for the upper extra-axial ray bundle $L_{UP}$. As a result, the lower extra-axial ray bundle $L_{LOW}$ reaching the observer's pupil 5 is not observed as if the image were projected at infinity, and the observer must refocus his/her eye to a point nearer than infinity to observe the lower image. Consequently, the observer's eye is likely to get fatigued.

Therefore, it is preferable to tilt the two-dimensional image display device 1 such that an end of the display device 1 which is closer to the second reflecting surface 3 is closer to the observer's visual axis Z than an end of the image display device 1 which is closer to the observer's pupil 5, as shown by the broken line 8 in FIG. 4. By shifting the two-dimensional image display device 1 to the illustrated position 8, the display device 1 is brought closer to the front focal point $F_O$ of the lower extra-axial ray bundle $L_{LOW}$, thereby enabling the observer to view an observation image at infinity even when he or she observes the lower image, and thus reducing the fatigue of the observer's eye.

With a view to providing a clearer image to the observer, it is even more desirable to form at least one of the two reflecting surfaces 2 and 3 or of the two transparent surfaces 6 and 7, which constitute the prism P, into a surface in which the curvature radius in a plane (i.e. a YZ-plane in FIG. 11) containing the optical axis and a line which is perpendicular (normal) to the at least one reflecting or transparent surface, and which passes through the intersection between the optical axis and the reflecting or transparent surface differs from the curvature radius in a plane (i.e. a plane containing the X-axis in FIG. 11) which perpendicularly intersects the above-described plane, and which contains the above-described line perpendicular to the reflecting or transparent surface.

The above-described two planes are herein defined as a Y-axis plane and an X-axis plane, respectively, of a reflecting or transparent surface, for the sake of description. Further, among bundles of light rays which emanate from the two-dimensional image display device 1 and reach the observer's pupil 5, a bundle of light rays which has a light component in only the X-axis plane of the observer's pupil 5 is defined as a ray bundle in the X-axis plane, and a bundle of light rays which has a light component in only the Y-axis plane of the observer's pupil 5 is defined as a ray bundle in the Y-axis plane.

Action that is obtained by forming at least one of the reflecting surfaces 2 and 3 or of the transparent surfaces 6 and 7 into a surface in which the curvature radius in the Y-axis plane and the curvature radius in the X-axis plane are different from each other will be explained below in detail with reference to FIG. 6.

FIG. 6 is a sectional view of a visual display apparatus in which reflecting surfaces 2 and 3 and transparent surfaces 6 and 7, which constitute a prism P. are each formed into a surface in which the curvature radii in the Y- and X-axis planes are equal to each other. In FIG. 6, reference numeral 1 denotes a two-dimensional image display device. The prism P has a first transparent surface 6, a first reflecting surface 2, a second reflecting surface 3, and a second transparent surface 7. Reference numeral 5 denotes an observer's pupil position. Reference symbol $I_x$ denotes a plane on which an X-axis image is formed, and $I_y$ denotes a plane on which a Y-axis image is formed.

When the curvature radii in the Y- and X-axis planes are equal to each other in each of the reflecting and transparent surfaces, the image formation plane $I_x$ of the X-axis image lies behind the two-dimensional image display device 1, as shown in FIG. 6. In other words, a ray bundle in the X-axis plane that emanates from the two-dimensional image display device 1 forms an image behind the observer's pupil 5. On the other hand, the image formation plane $I_y$ of the Y-axis image lies in front of the two-dimensional image display device 1. In other words, a ray bundle in the Y-axis plane that emanates from the two-dimensional image display device 1 forms an image in front of the observer's pupil 5. That is, large astigmatism exists in the visual display apparatus, and the observer may be incapable of viewing a sufficiently clear image when the image to be observed needs high resolution.

Accordingly, in order to provide the observer with an image which is clearer and of higher resolution, it is preferable to form at least one of the reflecting and transparent surfaces constituting the prism P into a configuration in which the curvature radii in the Y- and X-axis planes of the reflecting or transparent surface are different from each other. As has been described above, the ray bundle in the Y-axis plane is subjected to stronger positive power by the ocular optical system than the ray bundle in the X-axis plane. Therefore, the focal length for the ray bundle in the X-axis plane is longer than the focal length for the ray bundle in the Y-axis plane. The focal length difference must be minimized in order to obtain a clearer and higher-resolution image. To meet the requirement, it is important to make the power in the X-axis plane of the reflecting or transparent surface stronger than the positive power in the Y-axis plane to thereby reduce the focal length for the ray bundle in the X-axis plane.

With a view to achieving a compact structure, it is preferable that the angle θ (see FIG. 6) between the chief ray and the line normal to each of the two reflecting surfaces 2 and 3 should satisfy the following condition:

$$12.5°<\theta<32.5°$$

In order to achieve an even more compact structure, the angle θ is preferably set at approximately 22.5°.

With a view to achieving a compact structure, it is preferable that the relative tilt angle φ (see FIG. 6) between the two reflecting surfaces 2 and 3 should satisfy the following condition:

$$35°<\phi<55°$$

In order to achieve an even more compact structure, it is preferable for the angle φ to satisfy the following condition:

$$40°<\phi<50°$$

When the angle φ is approximately 45°, an arrangement which has been found to be the most desirable for achieving a compact structure is obtained.

Although the above-described prism optical system of the present invention is considered to be an ocular optical system, it will be readily conceivable that the prism optical system can be used as an imaging optical system in which the position of the two-dimensional image display device in the ocular optical system is used as an imagery point. More specifically, with the observer's pupil position 5 used as a stop plane, light rays from an approximately infinite object point form an image in the vicinity of the position where the two-dimensional image display device 1 is disposed in the ocular optical system. By disposing an imaging device, e.g. a CCD, or a photosensitive material, e.g. a film, at the image formation position, the prism optical system can be used as an imaging optical system.

In this case, it is preferable to provide a focus adjusting mechanism on the image formation plane, or to dispose an optical element having power in front of or behind the prism optical system, thereby making it possible to effect focus adjustment.

In order to obtain a visual display apparatus which provides a wider field angle to the observer, it is even more desirable to form both the reflecting surfaces 2 and 3, which constitute the prism P, into concave surfaces having positive power.

By forming both the reflecting surfaces 2 and 3 into concave mirrors, it is possible to minimize aberrations produced by the concave mirrors.

If both the reflecting surfaces 2 and 3 of the prism P constituting the ocular optical system are provided with positive power, the distance between the pupil position and the ocular optical system, that is, the eye relief, reduces. However, if a sufficiently long eye relief cannot be ensured, the visual display apparatus comes in contact with the observer's eyelid or forehead. Therefore, in order to ensure a sufficiently long eye relief and, at the same time, to achieve a compact visual display apparatus, it is preferable to satisfy the following condition:

$$30<f<100 \text{ [millimeters]}$$

If the composite focal length f of the ocular optical system is not shorter than the upper limit of the above condition, i.e. 100 millimeters, the size of the visual display apparatus becomes excessively large. If the composite focal length f is not longer than the lower limit of the condition, i.e. 30 millimeters, no sufficiently long eye relief can be ensured.

When particularly high resolution or particularly wide field angle is needed, it is important to form both the reflecting surfaces 2 and 3 into toric surfaces.

Aberration correction can be made even more favorably by properly adjusting the configuration of the two reflecting surfaces 2 and 3. It will be obvious that aberration correction can be made even more favorably by forming also the two transparent surfaces 6 and 7 into toric, aspherical or decentered surfaces.

In order to use the prism optical system of the present invention as a visual display apparatus having superimposing function, at least one of the two reflecting surfaces 2 and 3 of the prism P constituting the ocular optical system must be formed into a semitransparent surface. In order to allow the observer to simultaneously view an outside world scene in front of him or her and an electronic image transmitted from the two-dimensional image display device 1 to the observer's pupil 5, the reflecting surface 3 of the prism P, which lies in front of the observer's pupil 5, should be replaced with a semitransparent surface.

In the case of a visual display apparatus according to the present invention, even when either of the reflecting surfaces 2 and 3 is replaced with a semitransparent surface as a constituent element, there is no possibility that the observable field angle will reduce, or the size of the visual display apparatus will increase. Even if the visual display apparatus has superimposing function, the reduction of the quantity of light reaching the observer's pupil 5 is considerably smaller than in the prior art because only one semitransparent surface is included in the constituent elements of the ocular optical system, and moreover, bundles of light rays coming respectively from the two-dimensional image display device 1 and the outside world to reach the observer's pupil 5 are each subjected to the action of the semitransparent surface only once.

A semitransparent surface used in the above-described prism optical system has a transmittance-to-reflectance ratio in the range of from 2:8 to 8:2.

Such a semitransparent surface may be realized by any of the following methods: one in which the bundle of incident rays is divided in terms of area; another in which the bundle of incident rays is divided in terms of light intensity; and another in which the bundle of incident rays is divided in terms of both area and intensity.

FIG. 7 shows the method in which the quantity of incident light is divided in terms of area. Referring to FIG. 7, an aluminum coating 42 is provided on a transparent substrate 41 of glass or plastic material. The aluminum coating 42 is formed in a mesh-like pattern of about several $\mu$m to 0.1 mm, whereby a reflectance and a transmittance are set overall (macrocosmically) by the ratio of the area of the reflecting portions to the area of the transmitting portions.

FIG. 8 shows the method in which incident light is divided into transmitted light and reflected light in terms of light intensity. This method can be realized relatively easily and enables the desired semitransparent surface to be produced at low cost. As shown in FIG. 8, a semitransparent thin film 43 is coated on a transparent substrate 41 of glass or plastic material, thereby enabling the quantity of incident light to be divided. As the semitransparent thin film 43, a metallic thin film such as Al (aluminum), Cr (chromium), etc. is generally used. It is also common to employ a method in which a multiplicity of thin films of $SiO_2$, $MgF_2$, etc. are combined together as a dielectric multilayer film.

FIG. 9 shows a light quantity dividing method by polarization of light as another method of dividing incident light into transmitted light and reflected light in terms of light intensity. Referring to FIG. 9, a polarizing semitransparent thin film 44 is coated on a transparent substrate 41 of glass or plastic material to allow p- and s-polarized light components to be selectively transmitted or reflected, thereby dividing the quantity of incident light. Thus, a transmittance and a reflectance are set by the ratio of the p-polarized light component to the s-polarized light component in the incident light.

The above-described methods may be used in combination.

It is also possible to employ a method in which incident light is divided into transmitted light and reflected light by a holographic element.

By using a pair of prism optical systems of the present invention, arranged as described above, it becomes unnecessary for the observer to view the observation image with one eye closed. If observation can be effected with both eyes, the observer can view the displayed image without fatigue. Further, if images with a disparity therebetween are presented to the right and left eyes, it is possible to realize stereoscopic vision. Further, it becomes possible to view the observation image in an easy posture by using a pair of optical systems according to the present invention and attaching thereto a support mechanism for supporting the optical systems with respect to the observer's head.

Thus, it is possible to form a portable visual display apparatus, such as a stationary or head-mounted visual display apparatus, which enables the observer to see with both eyes, by preparing a combination of a two-dimensional image display device and a prism optical system according to the present invention, which is used as an ocular optical system, for each of the left and right eyes, and supporting the two combinations apart from each other by the interpupillary distance, that is, the distance between the eyes. FIG. 10 shows the whole arrangement of an example of such a portable visual display apparatus. A display apparatus body unit 50 contains a pair of left and right prism optical systems such as those described above as ocular optical systems. A pair of two-dimensional image display devices, which comprise liquid crystal display devices, are disposed on the image planes of the left and right prism optical systems, respectively. The apparatus body unit 50 is provided with a pair of left and right temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears like the temples of a pair of glasses and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his or her head without feeling uncomfortable.

Further, a speaker 56 is provided on each rear frame 54 to enable the user to enjoy listening to stereophonic sound in addition to image observation. The display apparatus body unit 50 having the speakers 56 is connected with a reproducing unit 58, e.g., a portable video cassette unit, through an image and sound transmitting cord 57. Therefore, the user can enjoy not only observing an image but also listening to sound with the reproducing unit 58 retained on a desired position, e.g., a belt, as illustrated in the figure. Reference numeral 59 in the figure denotes a switch and volume control part of the reproducing unit 58. It should be noted that the top frame 52 contains electronic parts such as image and sound processing circuits.

The cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 57 may be connected to a computer to receive computer graphic images or message images or the like from the computer. To eliminate the bothersome cord, the image display system may be arranged to receive external radio signals through an antenna connected thereto.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 6 of a visual display apparatus in which the prism optical system of the present invention is used as an ocular optical system will be described below.

Figure 1:
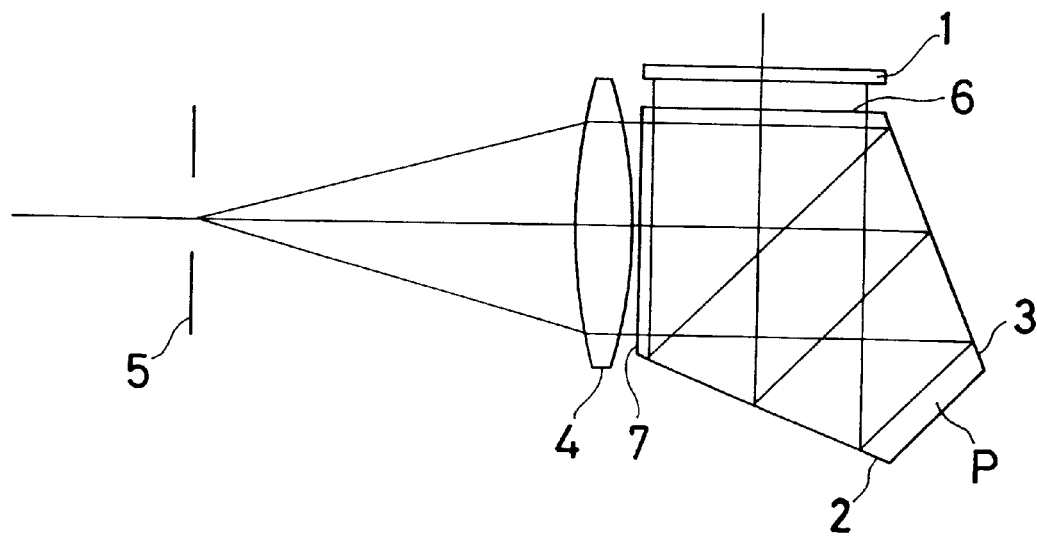
FIG. 1 is a sectional view of a visual display apparatus using a prism optical system according to the present invention.
Figure 2:
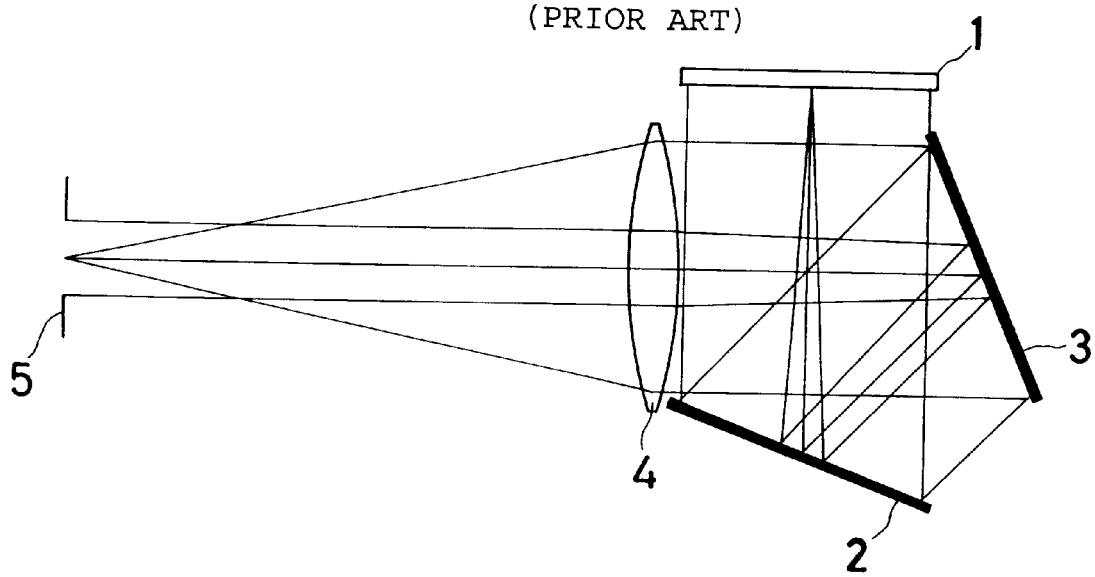
FIG. 2 is a sectional view showing the arrangement of an optical system of a conventional visual display apparatus.
Figure 3:
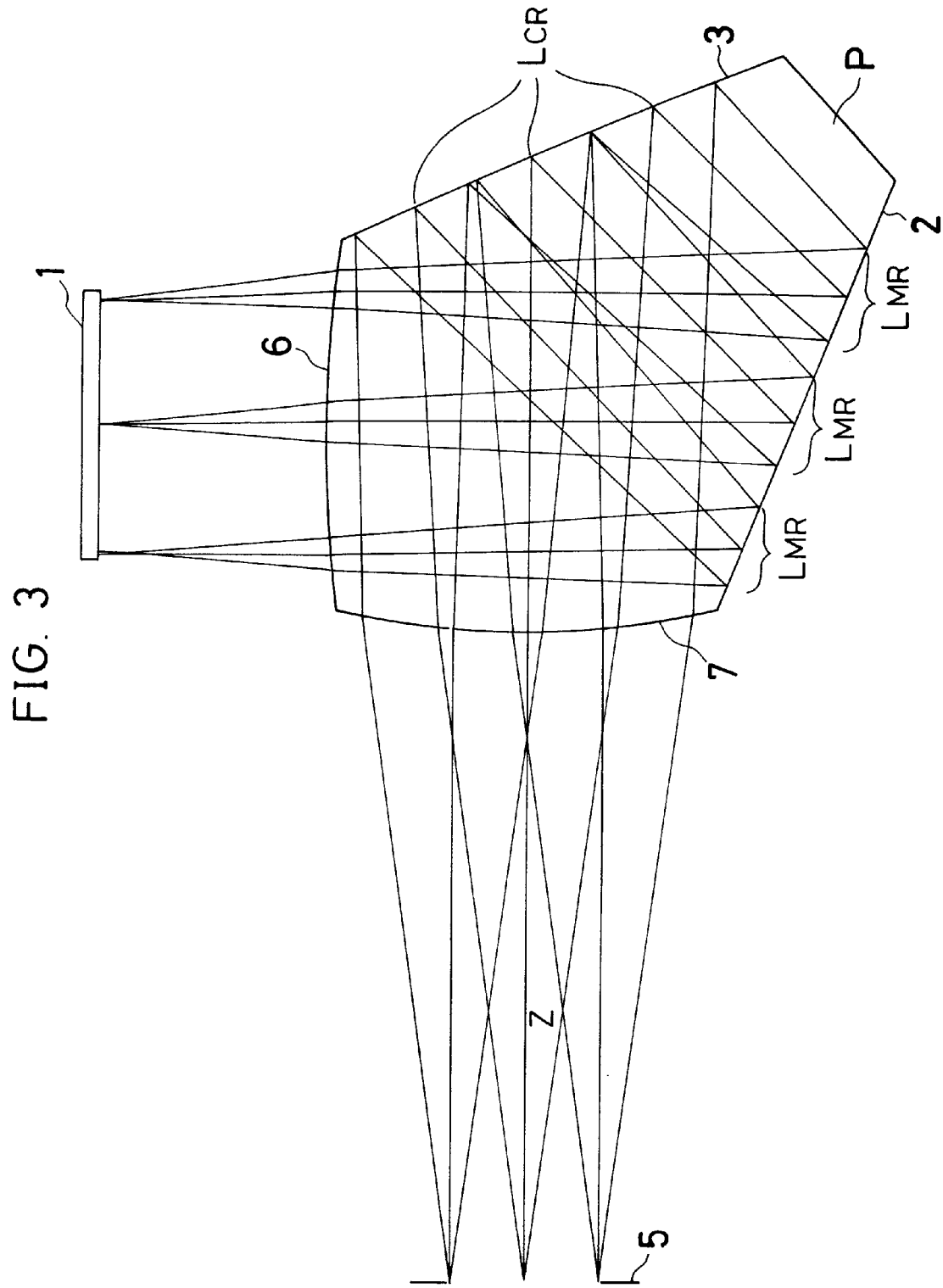
FIG. 3 illustrates an optical ray trace to explain the action of an optical arrangement in which a reflecting surface is formed from a concave surface.
Figure 4:
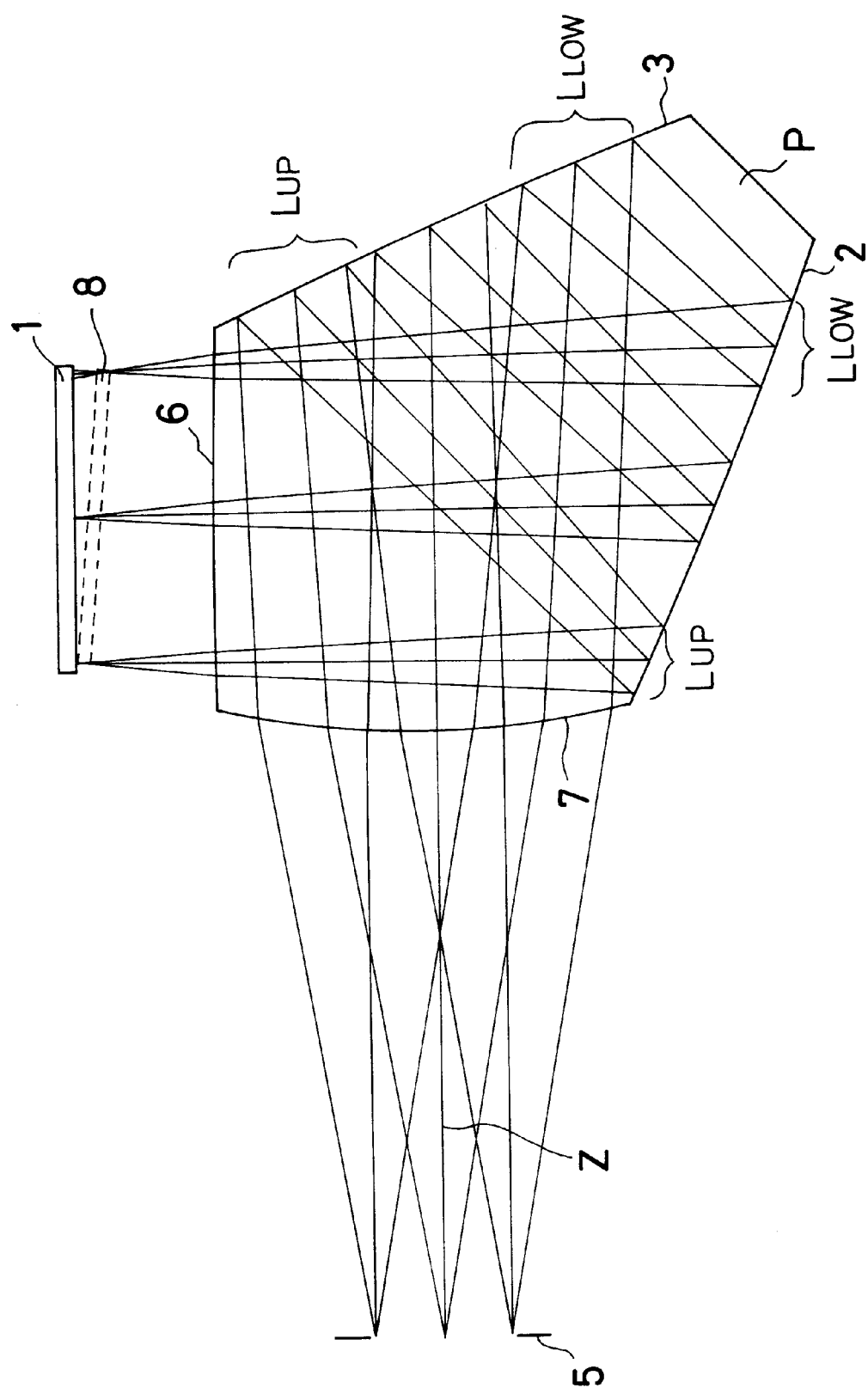
FIG. 4 illustrates an optical ray trace to explain the action of an optical arrangement in which two reflecting surfaces are formed from concave surfaces.
Figure 5A:
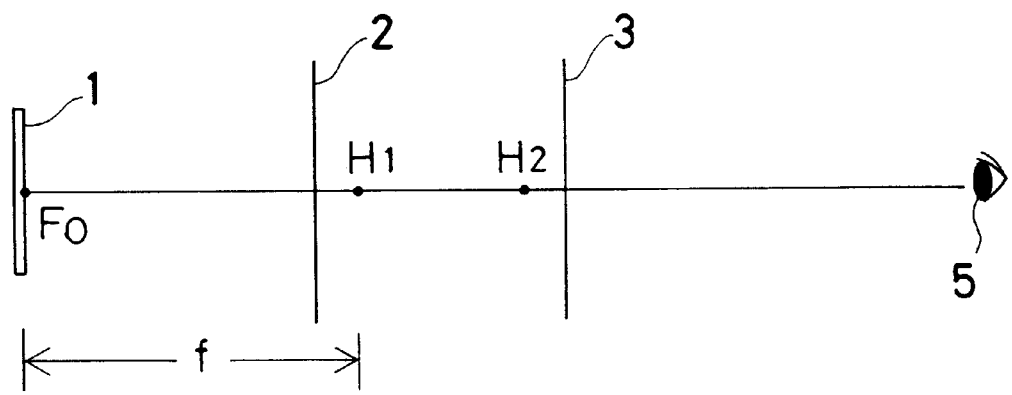
FIG. 5(a) illustrates a paraxial power distribution for an upper extra-axial ray bundle.
Figure 5B:
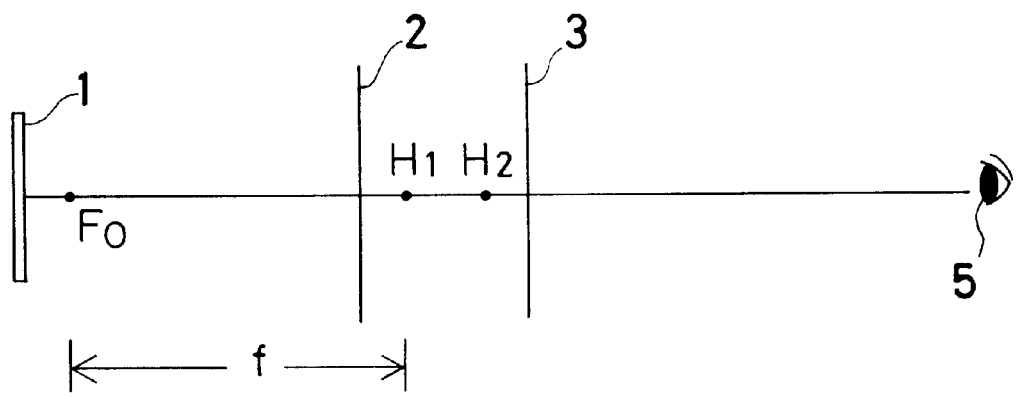
FIG. 5(b) illustrates a paraxial power distribution for a lower extra-axial ray bundle.
Figure 6:
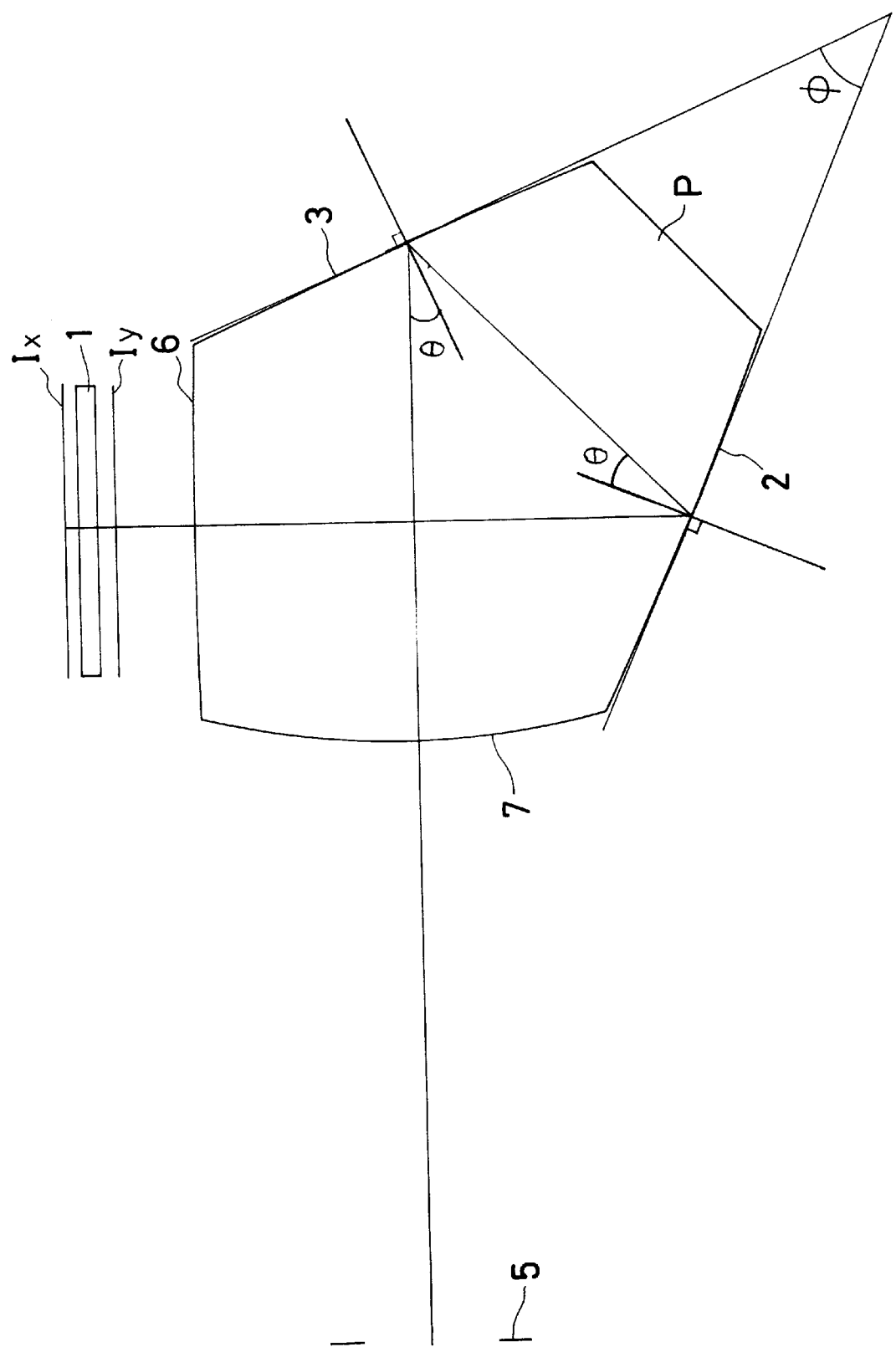
FIG. 6 is a sectional view of an optical arrangement in which the curvature radii in the meridional and sagittal planes are equal to each other in each of reflecting and transparent surfaces constituting a prism.
Figure 7:
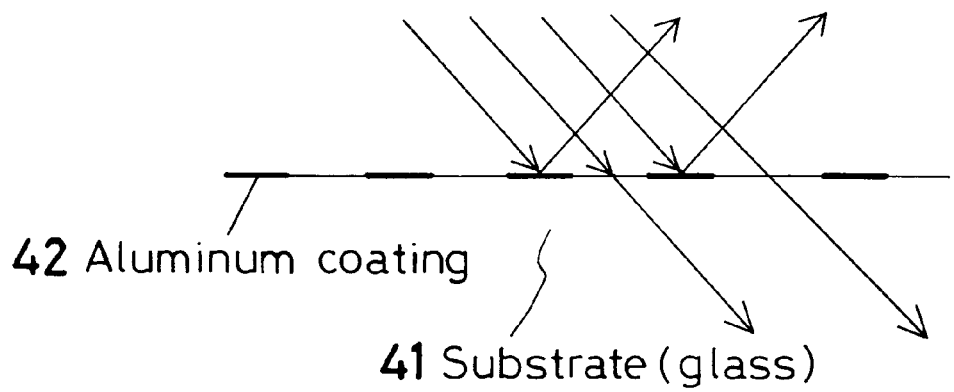
FIG. 7 shows the principle of a method for dividing the quantity of incident light in terms of area to realize a semitransparent surface.
Figure 8:
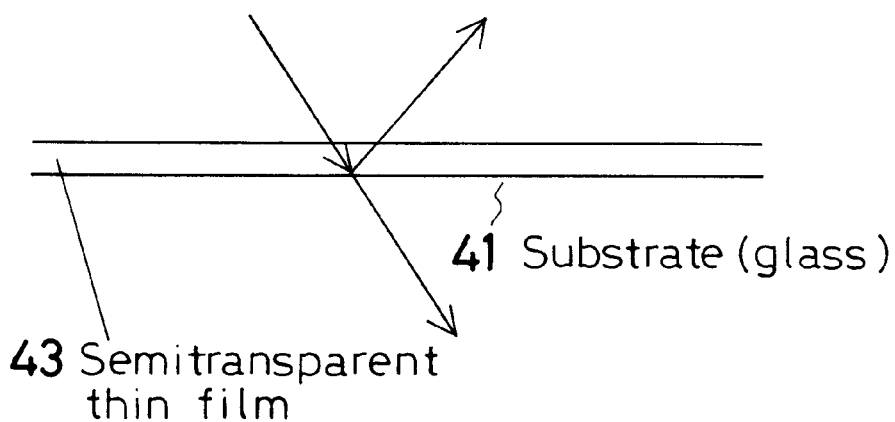
FIG. 8 shows the principle of a method for dividing the quantity of incident light in terms of light intensity to realize a semitransparent surface.
Figure 9:
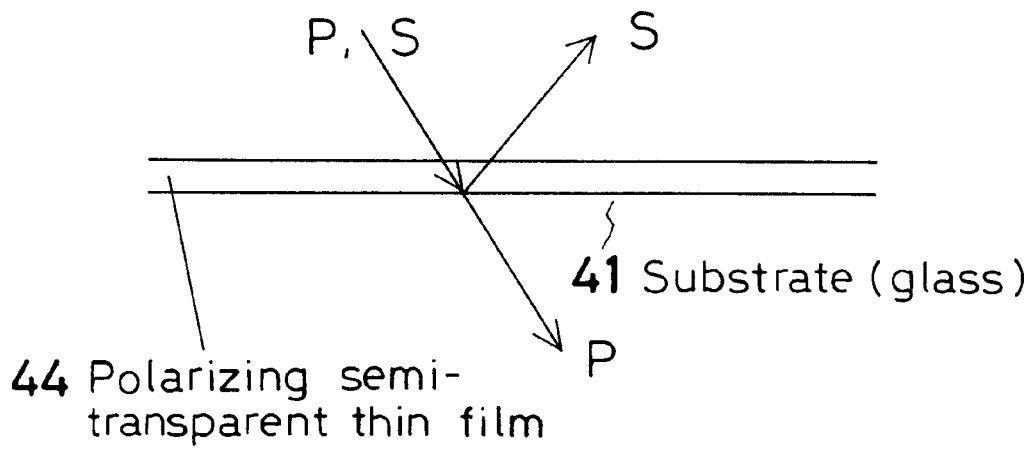
FIG. 9 shows the principle of a method for dividing the quantity of incident light by polarization of light to realize a semitransparent surface.
Figure 10:
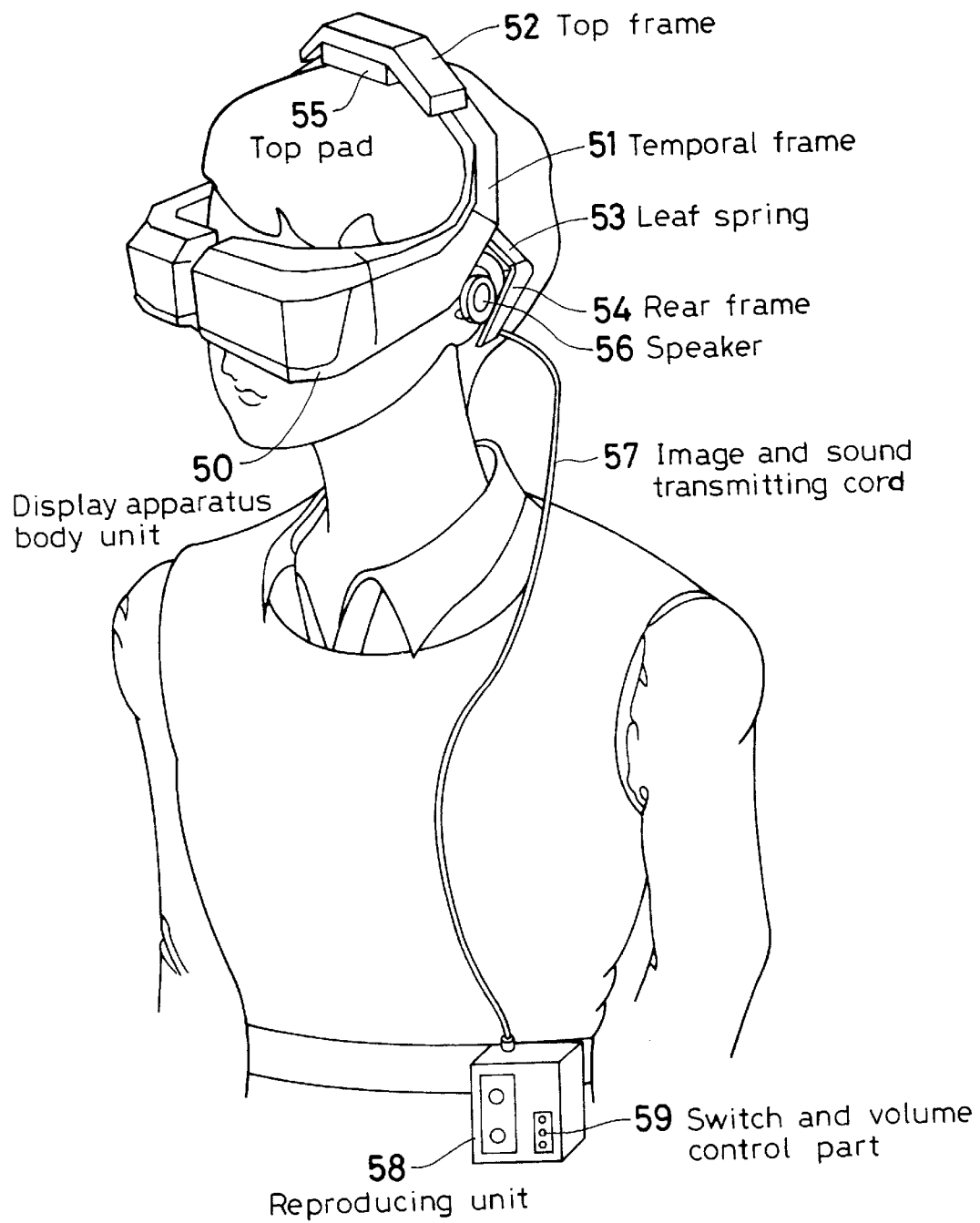
FIG. 10 shows the whole arrangement of an example of a portable visual display apparatus.
Figure 11:
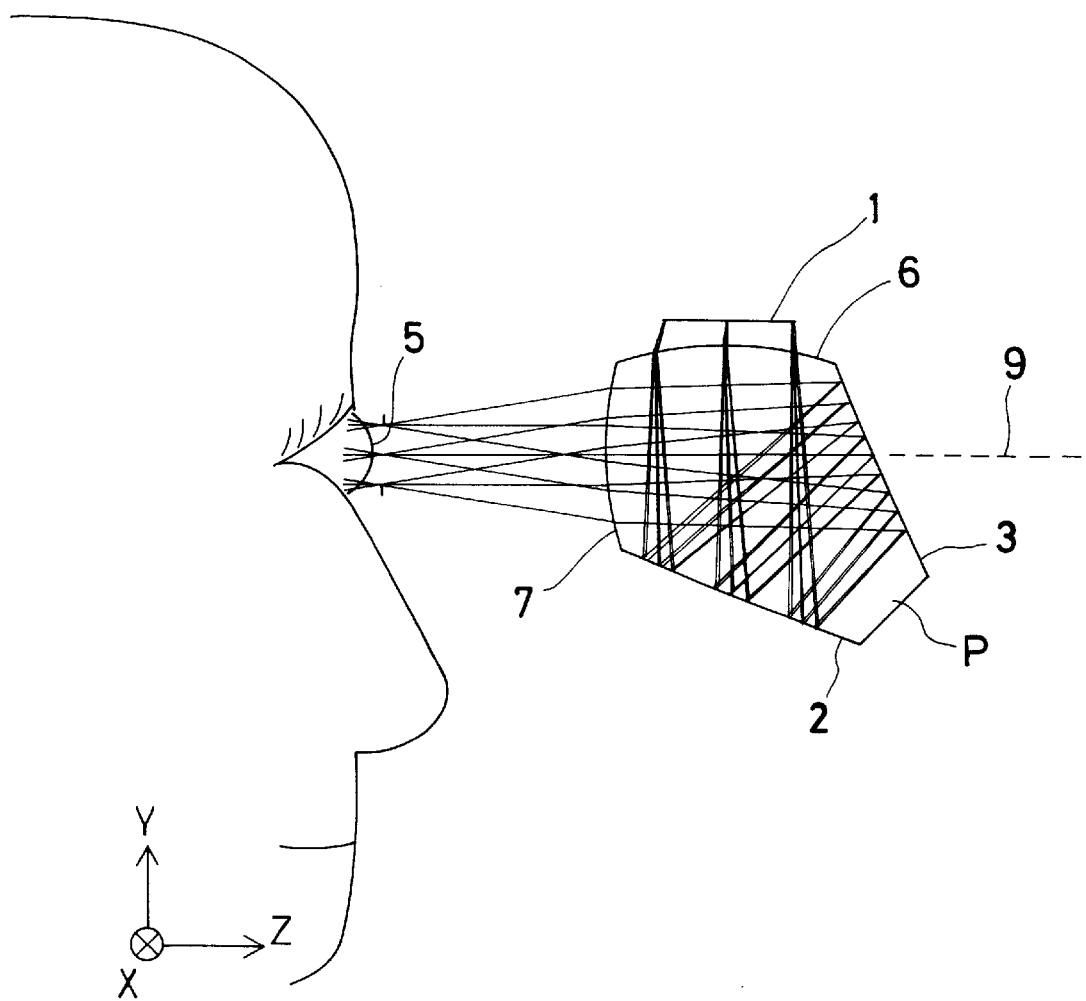
FIG. 11 is a sectional view showing Example 1 of a visual display apparatus in which the prism optical system of the present invention is used as an ocular optical system.

FIG. 11 is a sectional view of a visual display apparatus in Example 1. In the figure, reference numeral 1 denotes a two-dimensional image display device. A prism P has a first refracting surface 6, a first reflecting surface 2, a second reflecting surface 3, and a second refracting surface 7. Reference numeral 5 denotes a observer's pupil position, and 9 a visual axis lying when the observer sees forward.

Constituent parameters of the optical system will be shown later. In this example, the first reflecting surface 2 is a toric aspherical surface.

A coordinate system is defined as follows: As shown in FIG. 11, the horizontal direction of the observer is taken as X-axis, where the leftward direction is defined as positive direction; the direction of the observer's visual axis 9 is taken as Z-axis, where the direction from the eyeball side toward the second reflecting surface 3 is defined as positive direction; and the vertical direction of the observer is taken as Y-axis, where the upward direction is defined as positive direction.

In numerical data described later, the surface Nos. are shown as ordinal numbers in backward tracing from the observer's pupil position 5 toward the two-dimensional image display device 1.

The surface separation is shown as the distance from the intersection between the surface concerned and the optical axis to the intersection between the subsequent surface and the optical axis along the axial chief ray (optical axis). The inclination angle is the angle between a straight line passing through the intersection between the surface concerned and the optical axis and perpendicular to the optical axis and a line passing through the intersection and tangent to the surface. When the line passing through the intersection between the surface and the optical axis and tangent to the surface is inclined clockwise from the straight line passing through the intersection and perpendicular to the optical axis, the inclination angle is shown as being negative; when the inclination is counterclockwise, the inclination angle is shown as being positive.

The sign of the curvature radius of each surface is positive when the center of curvature lies behind the surface. When the curvature center lies in front of the surface, the sign is negative.

The surface configuration of the reflecting surfaces 2 and 3 and refracting surfaces 6 and 7 of the prism P may be expressed as follows:

$$Z = \{(X^2/R_X) + (Y^2/R_Y)\} \div [1 + \{1 - (1 + K_X)(X^2/R_X^2) - (1 + K_Y)(Y^2/R_Y^2)\}^{1/2}] + AR[(1-AP)X^2 + (1+AP)Y^2]^2 + BR[(1-BP)X^2 + (1+BP)Y^2]^3$$

where $R_X$ is the paraxial curvature radius of each surface in a plane perpendicular to the XZ-plane (the plane of the figure); $R_Y$ is the paraxial curvature radius of each surface in the YZ-plane; $K_X$ is the conical coefficient in the direction X; $K_Y$ is the conical coefficient in the direction Y; AR and BR are 4th- and 6th-order rotationally symmetric aspherical coefficients, respectively; and AP and BP are 4th- and 6th-order rotationally asymmetric aspherical coefficients.

When the surface configuration is rotationally symmetric, $R_X$, $K_X$, AP and BP are not specially shown. Further, when the surface configuration is spherical, $K_X$, $K_Y$, AR, BR, AP and BP are not specially shown.

In Example 1, the horizontal field angle is 25°, and the vertical field angle is 19°. The pupil diameter is 8 millimeters, the focal length is 50 millimeters, and F-number is 6.25.

Figure 12:
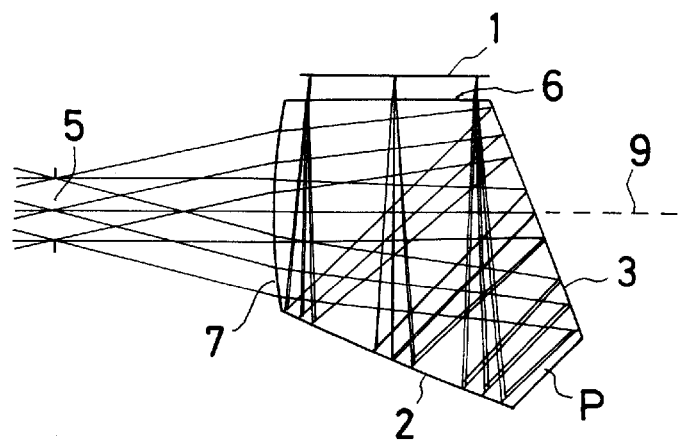
FIG. 12 is a sectional view showing Example 2 of the present invention.

FIG. 12 is a sectional view of a visual display apparatus in Example 2. The arrangement of the visual display apparatus is the same as in Example 1. Constituent parameters of the optical system will be shown later. In the numerical data, the surface No., the surface separation, the inclination angle, the sign of the curvature radius of each surface, the surface configurations of the reflecting surfaces 2 and 3 and refracting surfaces 6 and 7 of the prism P are expressed in the same way as in Example 1.

In Example 2, the horizontal field angle is 35°, and the vertical field angle is 26°. The pupil diameter is 8 millimeters, the focal length is 50 millimeters, and F-number is 6.25.

Figure 13:
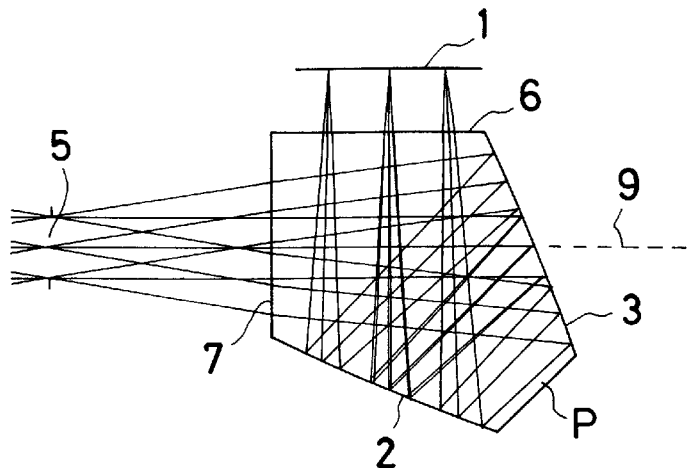
FIG. 13 is a sectional view showing Example 3 of the present invention.

FIG. 13 is a sectional view of a visual display apparatus in Example 3. The arrangement of the visual display apparatus is the same as in Example 1. Constituent parameters of the optical system will be shown later. In the numerical data, the surface No., the surface separation, the inclination angle, the sign of the curvature radius of each surface, the surface configurations of the reflecting surfaces 2 and 3 and refracting surfaces 6 and 7 of the prism P are expressed in the same way as in Example 1.

In Example 3, the horizontal field angle is 25°, and the vertical field angle is 19°. The pupil diameter is 8 millimeters, the focal length is 50 millimeters, and F-number is 6.25.

Figure 14:
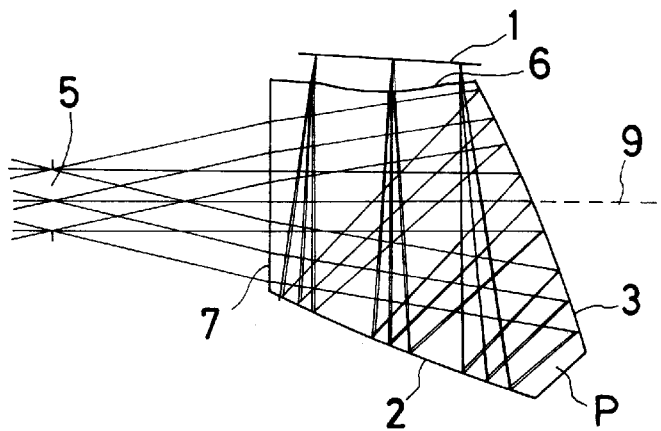
FIG. 14 is a sectional view showing Example 4 of the present invention.

FIG. 14 is a sectional view of a visual display apparatus in Example 4. The arrangement of the visual display apparatus is the same as in Example 1. In this example, however, all the constituent elements of the prism P, i.e. the first refracting surface 6, the first reflecting surface 2, the second reflecting surface 3, and the second refracting surface 7, are toric aspherical surfaces. Constituent parameters of the optical system will be shown later. In the numerical data, the surface No., the surface separation, the inclination angle, the sign of the curvature radius of each surface, the surface configurations of the reflecting surfaces 2 and 3 and refracting surfaces 6 and 7 of the prism P are expressed in the same way as in Example 1.

In Example 4, the horizontal field angle is 35°, and the vertical field angle is 26°. The pupil diameter is 8 millimeters, the focal length is 50 millimeters, and F-number is 6.25.

Figure 15:
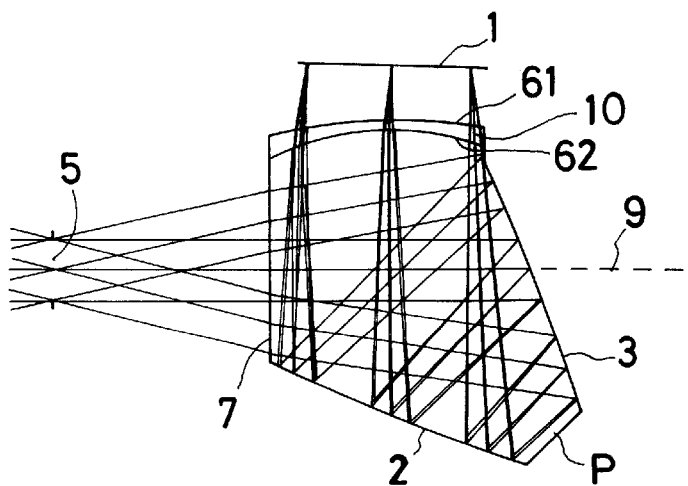
FIG. 15 is a sectional view showing Example 5 of the present invention.

FIG. 15 is a sectional view of a visual display apparatus in Example 5. In the figure, reference numeral 1 denotes a two-dimensional image display device. A negative meniscus lens 10 is cemented to a first refracting surface 62 of a prism P. The prism P has as constituent elements a first refracting surface 62, a first reflecting surface 2, a second reflecting surface 3, and a second refracting surface 7. Reference numeral 5 denotes an observer's pupil position, and 9 a visual axis lying when the observer sees forward. It should be noted that reference numeral 61 denotes a refracting surface of the negative meniscus lens at a side thereof which is closer to the two-dimensional image display device 1.

Constituent parameters of the optical system will be shown later. In this example, the first reflecting surface 2, the second reflecting surface 3, and the second refracting surface 7 are toric aspherical surfaces. In the numerical data (shown later), the surface No., the surface separation, the inclination angle, the sign of the curvature radius of each surface, the surface configurations of the reflecting surfaces 2 and 3 and refracting surfaces 6 and 7 of the prism P are expressed in the same way as in Example 1.

In Example 5, the horizontal field angle is 35°, and the vertical field angle is 26°. The pupil diameter is 8 millimeters, the focal length is 50 millimeters, and F-number is 6.25.

Figure 16:
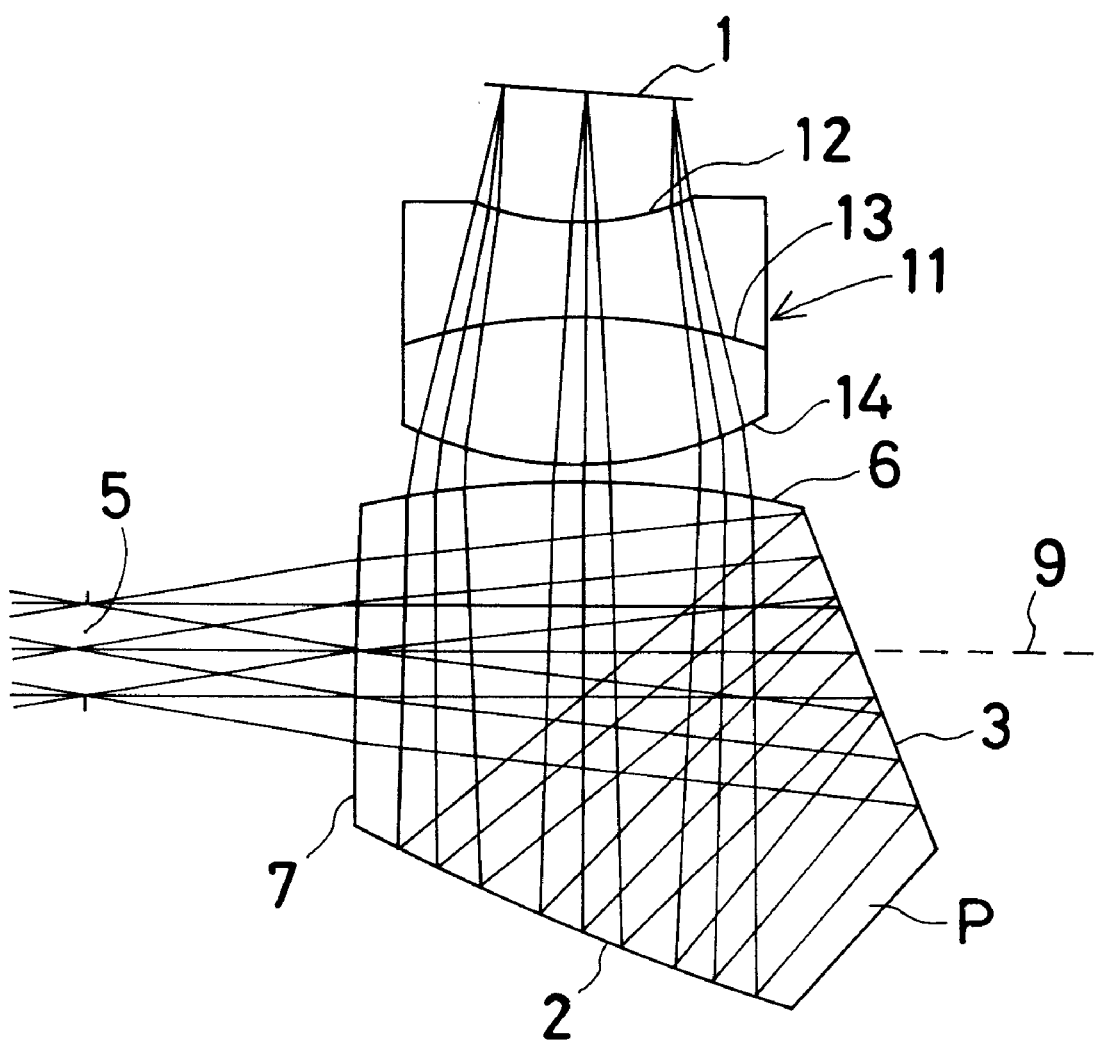
FIG. 16 is a sectional view showing Example 6 of the present invention.

FIG. 16 is a sectional view of a visual display apparatus in Example 6. In the figure, reference numeral 1 denotes a two-dimensional image display device. A cemented lens 11 is disposed between the two-dimensional image display device 1 and a prism P. The cemented lens 11 has three refracting surfaces 12, 13 and 14. The prism P has as constituent elements a first refracting surface 6, a first reflecting surface 2, a second reflecting surface 3, and a second refracting surface 7. Reference numeral 5 denotes an observer's pupil position, and 9 a visual axis lying when the observer sees forward.

Constituent parameters of the optical system will be shown later. In this example, the first reflecting surface 2 and the second reflecting surface 3 are toric surfaces. In the numerical data (shown later), the surface No., the surface separation, the inclination angle, the sign of the curvature radius of each surface, the surface configurations of the reflecting surfaces 2 and 3 and refracting surfaces 6 and 7 of the prism P are expressed in the same way as in

EXAMPLE 1

In Example 6, the horizontal field angle is 25°, and the vertical field angle is 18.9°. The pupil diameter is 8 millimeters, the focal length is 50 millimeters and F-number is 6.25.

Numerical data concerning the above Examples 1 to 6 will be shown below:

| Surface No. | | Curvature radius | Surface separation | Refractive index | Abbe constant | Inclination angle |
|---|---|---|---|---|---|---|
| Example 1 | | | | | | |
| 1 (5) | | ∞ (pupil) | 30.00 | | | |
| 2 (7) | $R_Y$ | 45.25 | 35.00 | 1.516 | 64.1 | |
| | | (refracting surface) | | | | |
| 3 (3) | $R_Y$ | ∞ | −27.00 | 1.516 | 64.1 | 22.5° |
| | | (reflecting surface) | | | | |
| 4 (2) | $R_Y$ | 225.71 | 34.00 | 1.516 | 64.1 | 22.5° |
| | $R_X$ | 205.32 | | | | |
| | AR | $-0.13973 \times 10^{-5}$ | | | | |
| | BR | $-0.32510 \times 10^{-1}$ | | | | |
| | | (reflecting surface) | | | | |
| 5 (6) | $R_Y$ | −42.44 | 3.25 | | | |
| | | (refracting surface) | | | | |
| 6 (1) | | ∞ | | | | |
| | | (display device) | | | | |
| Example 2 | | | | | | |
| 1 (5) | | ∞ (pupil) | 20.00 | | | |
| 2 (7) | $R_Y$ | 80.64 | 35.00 | 1.516 | 64.1 | |
| | | (refracting surface) | | | | |
| 3 (3) | $R_Y$ | −302.68 | −27.00 | 1.516 | 64.1 | 22.5° |
| | | (reflecting surface) | | | | |
| 4 (2) | $R_Y$ | 364.35 | 34.00 | 1.516 | 64.1 | 22.5° |
| | $R_X$ | 227.30 | | | | |
| | AR | $-0.21846 \times 10^{-6}$ | | | | |
| | BR | $-0.90047 \times 10^{-2}$ | | | | |
| | | (reflecting surface) | | | | |
| 5 (6) | $R_Y$ | −407.58 | 4.56 | | | |
| | | (refracting surface) | | | | |
| 6 (1) | | ∞ | | | | |
| | | (display device) | | | | |
| Example 3 | | | | | | |
| 1 (5) | | ∞ (pupil) | 30.00 | | | |
| 2 (7) | $R_Y$ | ∞ | 35.00 | 1.516 | 64.1 | |
| | | (refracting surface) | | | | |
| 3 (3) | $R_Y$ | −199.10 | −27.00 | 1.516 | 64.1 | 22.5° |
| | | (reflecting surface) | | | | |
| 4 (2) | $R_Y$ | 463.53 | 34.00 | 1.516 | 64.1 | 22.5° |
| | $R_X$ | 237.57 | | | | |
| | AR | $0.16363 \times 10^{-8}$ | | | | |
| | BR | $0.21103 \times 10^{+1}$ | | | | |
| | | (reflecting surface) | | | | |
| 5 (6) | $R_Y$ | ∞ | 11.49 | | | |
| | | (refracting surface) | | | | |
| 6 (1) | | ∞ | | | | |
| | | (display device) | | | | |
| Example 4 | | | | | | |
| 1 (5) | | ∞ (pupil) | 30.00 | | | |
| 2 (7) | $R_Y$ | ∞ | 35.00 | 1.516 | 64.1 | |
| | $R_X$ | 89.69 | | | | |
| | AR | $0.51558 \times 10^{-8}$ | | | | |
| | BR | $-0.14580 \times 10^{+2}$ | | | | |
| | BR | $-0.13733 \times 10^{-10}$ | | | | |
| | BP | $-0.31353 \times 10^{+1}$ | | | | |
| | | (refracting surface) | | | | |
| 3 (3) | $R_Y$ | −183.56 | −27.00 | 1.516 | 64.1 | 22.5° |
| | $R_X$ | −337.34 | | | | |
| | AR | $0.20690 \times 10^{-7}$ | | | | |
| | BR | $-0.34036 \times 10^{+1}$ | | | | |
| | BR | $0.84874 \times 10^{-13}$ | | | | |
| | BP | $0.63257 \times 10^{+1}$ | | | | |
| | | (reflecting surface) | | | | |
| 4 (2) | $R_Y$ | 333.88 | 34.00 | 1.516 | 64.1 | 22.5° |
| | $R_X$ | 191.25 | | | | |
| | AR | $0.22633 \times 10^{-8}$ | | | | |
| | BR | $-0.91782 \times 10^{+1}$ | | | | |
| | BR | $0.38119 \times 10^{-12}$ | | | | |
| | BP | $-0.54414 \times 10^{+1}$ | | | | |
| | | (reflecting surface) | | | | |
| 5 (6) | $R_Y$ | 33.96 | 4.48 | | | |

-continued

| Surface No. | | Curvature radius | Surface separation | Refractive index | Abbe constant | Inclination angle |
|---|---|---|---|---|---|---|
| | $R_X$ | −138.88 | | | | |
| | AR | 0.10261× $10^{-6}$ | | | | |
| | BR | −0.80831× $10^{+1}$ | | | | |
| | BR | −0.37994× $10^{-7}$ | | | | |
| | BP | 0.11498× $10^{+1}$ | | | | |
| | | (refracting surface) | | | | |
| 6 (1) | | ∞ | | | | −4.4° |
| | | (display device) | | | | |
| Example 5 | | | | | | |
| 1 (5) | | ∞ (pupil) | 30.00 | | | |
| 2 (7) | $R_Y$ | ∞ | 35.00 | 1.516 | 64.1 | |
| | $R_X$ | 92.74 | | | | |
| | AR | 0.27732× $10^{-6}$ | | | | |
| | BR | −0.11814× $10^{+1}$ | | | | |
| | BR | −0.18692×$10^{-10}$ | | | | |
| | BP | −0.30827× $10^{+1}$ | | | | |
| | | (refracting surface) | | | | |
| 3 (3) | $R_Y$ | −201.18 | −27.00 | 1.516 | 64.1 | 21.0° |
| | $R_X$ | −406.86 | | | | |
| | AR | 0.40241× $10^{-7}$ | | | | |
| | BR | −0.17440× $10^{+1}$ | | | | |
| | BR | −0.38229×$10^{-10}$ | | | | |
| | BP | 0.12038× $10^{-1}$ | | | | |
| | | (reflecting surface) | | | | |
| 4 (2) | $R_Y$ | 547.75 | 38.00 | 1.516 | 64.1 | 28.0° |
| | $R_X$ | 269.75 | | | | |
| | AR | 0.25971× $10^{-8}$ | | | | |
| | BR | −0.55345× $10^{+1}$ | | | | |
| | BR | 0.41015×$10^{-17}$ | | | | |
| | BP | −0.25581× $10^{+3}$ | | | | |
| | | (reflecting surface) | | | | |
| 5 (61) | $R_Y$ | −31.47 | 1.00 | 1.805 | 25.4 | |
| | | (refracting surface) | | | | |
| 6 (62) | $R_Y$ | −60.24 | 7.28 | | | |
| | | (refracting surface) | | | | |
| 7 (1) | | ∞ | | | | −2.6° |
| | | (display device) | | | | |
| Example 6 | | | | | | |
| 1 (5) | | ∞ (pupil) | 25.00 | | | |
| 2 (7) | $R_Y$ | 553.83 | 45.00 | 1.516 | 64.1 | |
| | | (refracting surface) | | | | |
| 3 (3) | $R_Y$ | −2999.68 | −35.00 | 1.516 | 64.1 | 22.5° |
| | $R_X$ | −736.79 | | | | |
| | | (reflecting surface) | | | | |
| 4 (2) | $R_Y$ | 316.65 | 40.00 | 1.516 | 64.1 | 22.5° |
| | $R_X$ | 388.76 | | | | |
| | | (reflecting surface) | | | | |
| 5 (6) | $R_Y$ | −87.68 | 1.0 | | | |
| | | (refracting surface) | | | | |
| 6 (14) | $R_Y$ | 33.79 | 13.6 | 1.744 | 44.7 | |
| | | (refracting surface) | | | | |
| 7 (13) | $R_Y$ | −46.69 | 8.0 | 1.755 | 27.6 | |
| | | (refracting surface) | | | | |
| 8 (12) | $R_Y$ | 25.16 | 12.0 | | | |
| | | (refracting surface) | | | | |
| 9 (1) | | ∞ | | | | −4.1° |
| | | (display device) | | | | |

Table below shows the angle between the chief ray and the line normal to each reflecting surfacer and the relative tilt angle φ between the two reflecting surfaces 2 and 3 in the above-described Examples 1 to 6.

| | θ | | |
|---|---|---|---|
| Example | Reflecting surface 2 | Reflecting surface 3 | ø |
| 1 | 22.5° | 22.5° | 45° |
| 2 | 22.5° | 22.5° | 45° |
| 3 | 22.5° | 22.5° | 45° |
| 4 | 22.5° | 22.5° | 45° |
| 5 | 22.5° | 22.5° | 45° |
| 6 | 22.5° | 22.5° | 45° |

Although in the above Examples 1 to 6 all the elements constituting the ocular optical system are handled as reflecting or refracting surfaces, the second reflecting surface 3 may be formed from a semitransparent surface to thereby impart superimposing function to the ocular optical system.

Although in the above Examples 1 to 6, the X-axis is taken in the horizontal direction, and the Y-axis in the vertical direction, the X- and Y-axes may be taken in the vertical and horizontal directions, respectively.

As will be clear from the foregoing description, it is possible according to the present invention to provide a prism optical system for use as an ocular optical system, which makes it possible to realize a wide-field visual display apparatus which has a compact size as a whole, causes a minimal reduction of the light intensity in the ocular optical system, and provides an observation image which is clear as far as the edges of the visual field.

What I claim is:

1. A prism optical system comprising, in order from an image surface side along an optical path:

a first transparent surface;

a concave first reflecting surface;

a second reflecting surface; and a second transparent surface;

said first transparent surface, said first reflecting surface, said second reflecting surface, and said second transparent surface are disposed so that the four surfaces form surrounding surfaces of a single prism that face each other across said medium;

a space between said first transparent surface, which is disposed at said image surface side, and said second transparent surface, which is disposed at a pupil side of said prism optical system, being filled with a medium having a refractive index not less than 1.3;

the concavity of said first reflecting surface facing said medium;

said first reflecting surface and said second reflecting surface being tilted with respect to a chief ray, said chief ray being a light ray which emanates from a center of an image surface of said prism optical system, which is reflected by said first reflecting surface and said second reflecting surface, and which is perpendicularly incident on a pupil position of said prism optical system;

said first reflecting surface and said second reflecting surface are tilted relative to each other so as to diverge toward at least one of said image surface of said prism optical system and said pupil position in a plane in which an optical axis of said prism optical system bends;

said first reflecting surface and said second reflecting surface are disposed so that a light ray emanating from said image surface of said prism optical system approximately intersects a light ray emanating from said second transparent surface and enters said pupil position; and an angle θ between said chief ray and a line normal to at least one of said first reflecting surface and said second reflecting surface satisfies the following condition:

$$12.5° < θ < 32.5°.$$

2. A prism optical system comprising, in order from an image surface side along an optical path:
a first transparent surface;
a concave first reflecting surface;
a second reflecting surface; and
a second transparent surface;
a space between said first transparent surface, which is disposed at said image surface side, and said second transparent surface, which is disposed at a pupil side of said prism optical system, being filled with a medium having a refractive index not less than 1.3;
said first transparent surface, said first reflecting surface, said second reflecting surface, and said second transparent surface are disposed so that the four surfaces form surrounding surfaces of a single prism that face each other across said medium, the concavity of said first reflecting surface facing said medium;
said first reflecting surface and said second reflecting surface being tilted with respect to a chief ray, said chief ray being a light ray which emanates from a center of an image surface of said prism optical system, which is reflected by said first reflecting surface and said second reflecting surface, and which is perpendicularly incident on a pupil position of said prism optical system;
said first reflecting surface and said second reflecting surface are tilted relative to each other so as to diverge toward at least one of said image surface of said prism optical system and said pupil position in a plane in which an optical axis of said prism optical system bends;
said first reflecting surface and said second reflecting surface are disposed so that a light ray emanating from said image surface of said prism optical system approximately intersects a light ray emanating from said second transparent surface and enters said pupil position; and
a relative tilt angle φ between said first reflecting surface and said second reflecting surface satisfies the following condition:

$$35° < φ < 55°.$$

3. A prism optical system for use as an ocular optical system of a visual display apparatus, said prism optical system comprising:
an image forming means for observation, said image forming means being locatable in front of an observer's face; and
an ocular optical system for projecting an image of said image forming means in air as an enlarged image, said ocular optical system comprising, in order from an image forming means side:
a first transparent surface disposed in opposition to said image forming means,
a first reflecting surface,
a second reflecting surface, and
a second transparent surface,
a space between said first transparent surface, which is disposed at said image forming means side of said ocular optical system, and said second transparent surface, which is disposed at an observer's eyeball side of said ocular optical system, being filled with a medium having a refractive index not less than 1.3;
said first reflecting surface and said second reflecting surface being tilted with respect to a chief ray, said chief ray being a light ray which emanates from a center of said image forming means, which is reflected by said first reflecting surface and said second reflecting surface, and which is perpendicularly incident on a pupil position of said prism optical system; and
said first transparent surface, said first reflecting surface, said second reflecting surface, and said second transparent surface are disposed so that the four surfaces form surrounding surfaces of a single prism that face each other across said medium;
said first reflecting surface and said second reflecting surface are tilted relative to each other so as to diverge toward at least one of said image forming means and an observer's eyeball in a plane in which an optical axis of said prism optical system bends;
said first reflecting surface and said second reflecting surface are disposed so that a light ray emanating from said image forming means approximately intersects a light ray emanating from said ocular optical system and enters said observer's eyeball; and
an angle θ between said chief ray and a line normal to at least one of said first reflecting surface and said second reflecting surface satisfying the following condition:

$$12.5° < θ < 32.5°,$$

wherein
at least one of said first reflecting surface and said second reflecting surface is a reflecting surface having positive power.

4. A prism optical system for use as an ocular optical system of a visual display apparatus, said prism optical system comprising:
an image forming means for observation, said image forming means being locatable in front of an observer's face; and
an ocular optical system for projecting an image of said image forming means in air as an enlarged image, said ocular optical system comprising, in order from an image forming means side:
a first transparent surface disposed in opposition to said image forming means,
a first reflecting surface,
a second reflecting surface, and
a second transparent surface,
a space between said first transparent surface, which is disposed at said image forming means side of said ocular optical system, and said second transparent surface, which is disposed at an observer's eyeball side of said ocular optical system, being filled with a medium having a refractive index not less than 1.3;
said first transparent surface, said first reflecting surface, said second reflecting surface, and said second transparent surface are disposed so that the four surfaces form surrounding surfaces of a single prism that face each other across said medium, said first reflecting surface and said second reflecting surface being tilted with respect to a chief ray, said chief ray being a light ray which emanates from a center of said image forming means, which is reflected by said first reflecting surface and said second reflecting surface, and which is perpendicularly incident on a pupil position of said prism optical system; and said first reflecting surface and said second reflecting surface are tilted relative to each other so as to diverge toward at least one of said image forming means and an observer's eyeball in a plane in which an optical axis of said prism optical system bends;

said first reflecting surface and said second reflecting surface are disposed so that a light ray emanating from said image forming means approximately intersects a light ray emanating from said ocular optical system and enters said observer's eyeball; and a relative tilt angle φ between said first reflecting surface and said second reflecting surface satisfies the following condition:

$$35° < \phi < 55°$$

wherein at least one of said first reflecting surface and said second reflecting surface is a reflecting surface having positive power.

5. A prism optical system for use as an ocular optical system of a visual display apparatus, said prism optical system comprising:

an image forming means for observation, said image forming means being locatable in front of an observer's face;

an ocular optical system for projecting an image of said image forming means in air as an enlarged image, said ocular optical system comprising, in order from an image forming means side:

a first transparent surface disposed in opposition to said image forming means, a first reflecting surface, a second reflecting surface, and a second transparent surface, a space between said first transparent surface, which is disposed at said image forming means side of said ocular optical system, and said second transparent surface, which is disposed at an observer's eyeball side of said ocular optical system, being filled with a medium having a refractive index not less than 1.3;

said first transparent surface, said first reflecting surface, said second reflecting surface, and said second transparent surface are disposed so that the four surfaces form surrounding surfaces of a single prism that face each other across said medium, and support means for positioning a pair of said ocular optical system with respect to each other, said first reflecting surface and said second reflecting surface being tilted with respect to a chief ray, said chief ray being a light ray which emanates from a center of said image forming means, which is reflected by said first reflecting surface and said second reflecting surface, and which is perpendicularly incident on a pupil position of said prism optical system;

said first reflecting surface and said second reflecting surface are tilted relative to each other so as to diverge toward at least one of said image forming means and an observer's eyeball in a plane in which an optical axis of said prism optical system bends, said first reflecting surface and said second reflecting surface are disposed so that a light ray emanating from said image forming means approximately intersects a light ray emanating from said ocular optical system and enters said observer's eyeball, and an angle θ between said chief ray and a line normal to at least one of said first reflecting surface and said second reflecting surface satisfying the following condition:

$$12.5° < \theta < 32.5°.$$

6. A prism optical system for use as an ocular optical system of a visual display apparatus, said prism optical system comprising:

an image forming means for observation, an image forming means being locatable in front of an observer's face;

an ocular optical system for projecting an image of said image forming means in air as an enlarged image, said ocular optical system comprising, in order from an image forming means side:

a first transparent surface disposed in opposition to said image forming means, a first reflecting surface, a second reflecting surface, and a second transparent surface, a space between said first transparent surface, which is disposed at said image forming means side of said ocular optical system, and said second transparent surface, which is disposed at an observer's eyeball side of said ocular optical system, being filled with a medium having a refractive index not less than 1.3;

said first transparent surface, said first reflecting surface, said second reflecting surface, and said second transparent surface are disposed so that the four surfaces form surrounding surfaces of a single prism that face each other across said medium: and support means for positioning a pair of said ocular optical system with respect to each other, said first reflecting surface and said second reflecting surface being tilted with respect to a chief ray, said chief ray being a light ray which emanates from a center of said image forming means, which is reflected by said first reflecting surface and said second reflecting surface, and which is perpendicularly incident on a pupil position of said prism optical system, and said first reflecting surface and said second reflecting surface are tilted relative to each other so as to diverge toward at least one of said image forming means and an observer's eyeball in a plane in which an optical axis of said prism optical system bends, said first reflecting surface and said second reflecting surface are disposed so that a light ray emanating from said image forming means approximately intersects a light ray emanating from said ocular optical system and enters said observer's eyeball, and a relative tilt angle φ between said first reflecting surface and said second reflecting surface satisfies the following condition:

$$35° < \phi < 55°.$$

7. A prism optical system accord to any one of claims 1, 2, 3 or 4, wherein:
at least one of said first reflecting surface and said second reflecting surface is a toric surface.

8. A prism optical system according to claim 1, or 2, further comprising:
an imaging device disposed at a position of said image surface of said prism optical system.

9. A prism optical system according to any one of claims 1, 2, 3 or 4, wherein:
both said first reflecting surface and said second reflecting surface are reflecting surfaces having positive power.

10. A prism optical system according to any one of claims 1, 2, 3 or 4, wherein:
both said first reflecting surface and said second reflecting surface are toric surfaces.

11. A prism optical system according to any one of claims 1, 2, 3 or 4, wherein:
said second reflecting surface is a semitransparent surface.

12. A prism optical system according to claim 11, wherein:
said semitransparent surface has a transmittance of from 20% to 80%.

13. A prism optical system according to claim 2, wherein:
an angle θ between said chief ray and a line normal to at least one of said first reflecting surface and said second reflecting surface satisfies the following condition:

$$12.5° < \theta < 32.5°.$$

14. A prism optical system according to claim 13, wherein:
said condition is satisfied for said angle θ between said chief ray and a line normal to each of said first reflecting surface and said second reflecting surface.

15. A prism optical system according to claim 2, wherein:
an angle θ between said chief ray and a line normal to at least one of said first reflecting surface and said second reflecting surface satisfies the following condition:

$$\theta = 22.5°.$$

16. A prism optical system according to claim 15, wherein:
said condition is satisfied for said angle θ between said chief ray and a line normal to each of said first reflecting surface and said second reflecting surface.

17. A prism optical system according to claim 1, wherein:
a relative tilt angle φ between said first reflecting surface and said second reflecting surface satisfies the following condition:

$$35° < \phi < 55°.$$

18. A prism optical system according to claim 1, wherein:
a relative tilt angle φ between said first reflecting surface and said second reflecting surface satisfies the following condition:

$$40° < \phi < 50°.$$

19. A prism optical system according to claim 1 or 2, further comprising:
a photosensitive material disposed at a position of said image surface of said prism optical system.

20. A prism optical system according to claim 1 or 2, wherein said second reflecting surface has a curved surface configuration providing one of converging and diverging power to a light beam.

21. A prism optical system according to claim 3 or 4, wherein said first reflecting surface has a positive power, and said second reflecting surface has a curved surface configuration providing one of converging and diverging power to a light beam.

22. A prism optical system according to claim, 3 or 4, wherein said second reflecting surface has a positive power, and said first reflecting surface has a curved surface configuration providing one of converging and diverging a power to a light beam.

23. A prism optical system according to claim 5 or 6, further comprising:
means for supporting a pair of said ocular optical system on an observer's head.

24. A prism optical system according to claim 5 or 6, wherein both said first reflecting surface and said second reflecting surface have a curved surface configuration providing one of converging and diverging a power to a light beam.

25. A prism optical system comprising, in order from an image surface side along an optical path:
a first transparent surface;
a concave first reflecting surface;
a second reflecting surface; and
a second transparent surface;
a space between said first transparent surface, which is disposed at said image surface side, and said second transparent surface, which is disposed at a pupil side of said prism optical system, being filled with a medium having a refractive index not less than 1.3;
the concavity of said first reflecting surface facing said medium;
said first reflecting surface and said second reflecting surface being tilted with respect to a chief ray, said chief ray being a light ray which emanates from a center of an image surface of said prism optical system, which is reflected by said first reflecting surface and said second reflecting surface, and which is perpendicularly incident on a pupil position of said prism optical system;
said first reflecting surface and said second reflecting surface are tilted relative to each other so as to diverge toward at least one of said image surface of said prism optical system and said pupil position in a plane in which an optical axis of said prism optical system bends;
said first reflecting surface and said second reflecting surface are disposed so that a light ray emanating from said image surface of said prism optical system approximately intersects a light ray emanating from said second transparent surface and enters said pupil position; and
an angle θ between said chief ray and a line normal to at least one of said first reflecting surface and said second reflecting surface satisfies the following condition:

$$12.5° < \theta < 32.5°,$$

wherein both said first reflecting surface and said second reflecting surface are reflecting surfaces having positive power.

26. A prism optical system comprising, in order from an image surface side along an optical path:
  a first transparent surface;
  a concave first reflecting surface;
  a second reflecting surface; and
  a second transparent surface;
  a space between said first transparent surface, which is disposed at said image surface side, and said second transparent surface, which is disposed at a pupil side of said prism optical system, being filled with a medium having a refractive index not less than 1.3;
  the concavity of said first reflecting surface facing said medium;
  said first reflecting surface and said second reflecting surface being tilted with respect to a chief ray, said chief ray being a light ray which emanates from a center of an image surface of said prism optical system, which is reflected by said first reflecting surface and said second reflecting surface, and which is perpendicularly incident on a pupil position of said prism optical system;
  said first reflecting surface and said second reflecting surface are tilted relative to each other so as to diverge toward at least one of said image surface of said prism optical system and said pupil position in a plane in which an optical axis of said prism optical system bends;
  said first reflecting surface and said second reflecting surface are disposed so that a light ray emanating from said image surface of said prism optical system approximately intersects a light ray emanating from said second transparent surface and enters said pupil position; and
  a relative tilt angle $\phi$ between said first reflecting surface and said second reflecting surface satisfies the following condition:

$$35° < \phi < 55°,$$

wherein both said first reflecting surface and said second reflecting surface are reflecting surfaces having positive power.

27. A prism optical system for use as an ocular optical system of a visual display apparatus, said prism optical system comprising:
  an image forming means for observation, said image forming means being locatable in front of an observer's face; and
  an ocular optical system for projecting an image of said image forming means in air as an enlarged image, said ocular optical system comprising, in order from an image forming means side:
  a first transparent surface disposed in opposition to said image forming means,
  a first reflecting surface,
  a second reflecting surface, and
  a second transparent surface,
  a space between said first transparent surface, which is disposed at said image forming means side of said ocular optical system, and said second transparent surface, which is disposed at an observer's eyeball side of said ocular optical system, being filled with a medium having a refractive index not less than 1.3;
  said first reflecting surface and said second reflecting surface being tilted with respect to a chief ray, said chief ray being a light ray which emanates from a center of said image forming means, which is reflected by said first reflecting surface and said second reflecting surface, and which is perpendicularly incident on a pupil position of said prism optical system;
  said first reflecting surface and said second reflecting surface are tilted relative to each other so as to diverge toward at least one of said image forming means and an observer's eyeball in a plane in which an optical axis of said prism optical system bends;
  said first reflecting surface and said second reflecting surface are disposed so that a light ray emanating from said image forming means approximately intersects a light ray emanating from said ocular optical system and enters said observer's eyeball; and
  an angle $\theta$ between said chief ray and a line normal to at least one of said first reflecting surface and said second reflecting surface satisfying the following condition:

$$12.5° < \theta < 32.5°,$$

wherein at least one of said first reflecting surface and said second reflecting surface is a reflecting surface having positive power, and
  both said first reflecting surface and said second reflecting surface are reflecting surfaces having positive power.

28. A prism optical system for use as an ocular optical system of a visual display apparatus, said prism optical system comprising:
  an image forming means for observation, said image forming means being locatable in front of an observer's face; and
  an ocular optical system for projecting an image of said image forming means in air as an enlarged image, said ocular optical system comprising, in order from an image forming means side:
  a first transparent surface disposed in opposition to said image forming means,
  a first reflecting surface,
  a second reflecting surface, and
  a second transparent surface,
  a space between said first transparent surface, which is disposed at said image forming means side of said ocular optical system, and said second transparent surface, which is disposed at an observer's eyeball side of said ocular optical system, being filled with a medium having a refractive index not less than 1.3;
  said first reflecting surface and said second reflecting surface being tilted with respect to a chief ray, said chief ray being a light ray which emanates from a center of said image forming means, which is reflected by said first reflecting surface and said second reflecting surface, and which is perpendicularly incident on a pupil position of said prism optical system;
  said first reflecting surface and said second reflecting surface are tilted relative to each other so as to diverge toward at least one of said image forming means and an observer's eyeball in a plane in which an optical axis of said prism optical system bends;
  said first reflecting surface and said second reflecting surface are disposed so that a light ray emanating from said image forming means approximately intersects a light ray emanating from said ocular optical system and enters said observer's eyeball; and a relative tilt angle φ between said first reflecting surface and said second reflecting surface satisfies the following condition:

$$35° < \phi < 55°$$

wherein at least one of said first reflecting surface and said second reflecting surface is a reflecting surface having positive power, and both said first reflecting surface and said second reflecting surface are reflecting surfaces having positive power.

29. A prism optical system comprising, in order from an image surface side along an optical path:

a first transparent surface;

a concave first reflecting surface;

a second reflecting surface; and a second transparent surface;

a space between said first transparent surface, which is disposed at said image surface side, and said second transparent surface, which is disposed at a pupil side of said prism optical system, being filled with a medium having a refractive index not less than 1.3;

the concavity of said first reflecting surface facing said medium;

said first reflecting surface and said second reflecting surface being tilted with respect to a chief ray, said chief ray being a light ray which emanates from a center of an image surface of said prism optical system, which is reflected by said first reflecting surface and said second reflecting surface, and which is perpendicularly incident on a pupil position of said prism optical system;

said first reflecting surface and said second reflecting surface are tilted relative to each other so as to diverge toward at least one of said image surface of said prism optical system and said pupil position in a plane in which an optical axis of said prism optical system bends;

said first reflecting surface and said second reflecting surface are disposed so that a light ray emanating from said image surface of said prism optical system approximately intersects a light ray emanating from said second transparent surface and enters said pupil position; and an angle θ between said chief ray and a line normal to at least one of said first reflecting surface and said second reflecting surface satisfies the following condition:

$$12.5° < \theta < 32.5°,$$

wherein both said first reflecting surface and said second reflecting surface are toric surfaces.

30. A prism optical system comprising, in order from an image surface side along an optical path:

a first transparent surface;

a concave first reflecting surface;

a second reflecting surface; and a second transparent surface;

a space between said first transparent surface, which is disposed at said image surface side, and said second transparent surface, which is disposed at a pupil side of said prism optical system, being filled with a medium having a refractive index not less than 1.3;

the concavity of said first reflecting surface facing said medium;

said first reflecting surface and said second reflecting surface being tilted with respect to a chief ray, said chief ray being a light ray which emanates from a center of an image surface of said prism optical system, which is reflected by said first reflecting surface and said second reflecting surface, and which is perpendicularly incident on a pupil position of said prism optical system;

said first reflecting surface and said second reflecting surface are tilted relative to each other so as to diverge toward at least one of said image surface of said prism optical system and said pupil position in a plane in which an optical axis of said prism optical system bends;

said first reflecting surface and said second reflecting surface are disposed so that a light ray emanating from said image surface of said prism optical system approximately intersects a light ray emanating from said second transparent surface and enters said pupil position; and a relative tilt angle φ between said first reflecting surface and said second reflecting surface satisfies the following condition:

$$35° < \phi < 55°,$$

wherein both said first reflecting surface and said second reflecting surface are toric surfaces.

31. A prism optical system for use as an ocular optical system of a visual display apparatus, said prism optical system comprising:

an image forming means for observation, said image forming means being locatable in front of an observer's face; and an ocular optical system for projecting an image of said image forming means in air as an enlarged image, said ocular optical system comprising, in order from an image forming means side:

a first transparent surface disposed in opposition to said image forming means, a first reflecting surface, a second reflecting surface, and a second transparent surface, a space between said first transparent surface, which is disposed at said image forming means side of said ocular optical system, and said second transparent surface, which is disposed at an observer's eyeball side of said ocular optical system, being filled with a medium having a refractive index not less than 1.3;

said first reflecting surface and said second reflecting surface being tilted with respect to a chief ray, said chief ray being a light ray which emanates from a center of said image forming means, which is reflected by said first reflecting surface and said second reflecting surface, and which is perpendicularly incident on a pupil position of said prism optical system;

said first reflecting surface and said second reflecting surface are tilted relative to each other so as to diverge toward at least one of said image forming means and an observer's eyeball in a plane in which an optical axis of said prism optical system bends;

said first reflecting surface and said second reflecting surface are disposed so that a light ray emanating from said image forming means approximately intersects a light ray emanating from said ocular optical system and enters said observer's eyeball; and an angle θ between said chief ray and a line normal to at least one of said first reflecting surface and said second reflecting surface satisfying the following condition:

$$12.5° < \theta < 32.5°,$$

wherein at least one of said first reflecting surface and said second reflecting surface is a reflecting surface having positive power, and both said first reflecting surface and said second reflecting surface are toric surfaces.

32. A prism optical system for use as an ocular optical system of a visual display apparatus, said prism optical system comprising:

an image forming means for observation, said image forming means being locatable in front of an observer's face; and an ocular optical system for projecting an image of said image forming means in air as an enlarged image, said ocular optical system comprising, in order from an image forming means side:

a first transparent surface disposed in opposition to said image forming means, a first reflecting surface, a second reflecting surface, and a second transparent surface, a space between said first transparent surface, which is disposed at said image forming means side of said ocular optical system, and said second transparent surface, which is disposed at an observer's eyeball side of said ocular optical system, being filled with a medium having a refractive index not less than 1.3;

said first reflecting surface and said second reflecting surface being tilted with respect to a chief ray, said chief ray being a light ray which emanates from a center of said image forming means, which is reflected by said first reflecting surface and said second reflecting surface, and which is perpendicularly incident on a pupil position of said prism optical system; and said first reflecting surface and said second reflecting surface are tilted relative to each other so as to diverge toward at least one of said image forming means and an observer's eyeball in a plane in which an optical axis of said prism optical system bends;

said first reflecting surface and said second reflecting surface are disposed so that a light ray emanating from said image forming means approximately intersects a light ray emanating from said ocular optical system and enters said observer's eyeball; and a relative tilt angle φ between said first reflecting surface and said second reflecting surface satisfies the following condition:

$$35° < \phi < 55°,$$

wherein at least one of said first reflecting surface and said second reflecting surface is a reflecting surface having positive power, and both said first reflecting surface and said second reflecting surface are toric surfaces.

* * * * *